INVENTORS
THOMAS C. MURRAY
RUSSELL R. ROBERTS
BY JOSEPH B. STONE

ATTORNEYS

May 2, 1967 T. C. MURRAY ETAL 3,316,875
XEROGRAPHIC DEVELOPING APPARATUS
Filed March 2, 1964 18 Sheets-Sheet 2

INVENTORS
THOMAS C. MURRAY
RUSSELL R. ROBERTS
BY JOSEPH B. STONE

ATTORNEYS

May 2, 1967

T. C. MURRAY ET AL 3,316,875

XEROGRAPHIC DEVELOPING APPARATUS

Filed March 2, 1964

INVENTORS
THOMAS C. MURRAY
RUSSELL R. ROBERTS
BY JOSEPH B. STONE

ATTORNEYS

INVENTORS
THOMAS C. MURRAY
RUSSELL R. ROBERTS
BY JOSEPH B. STONE

ATTORNEYS

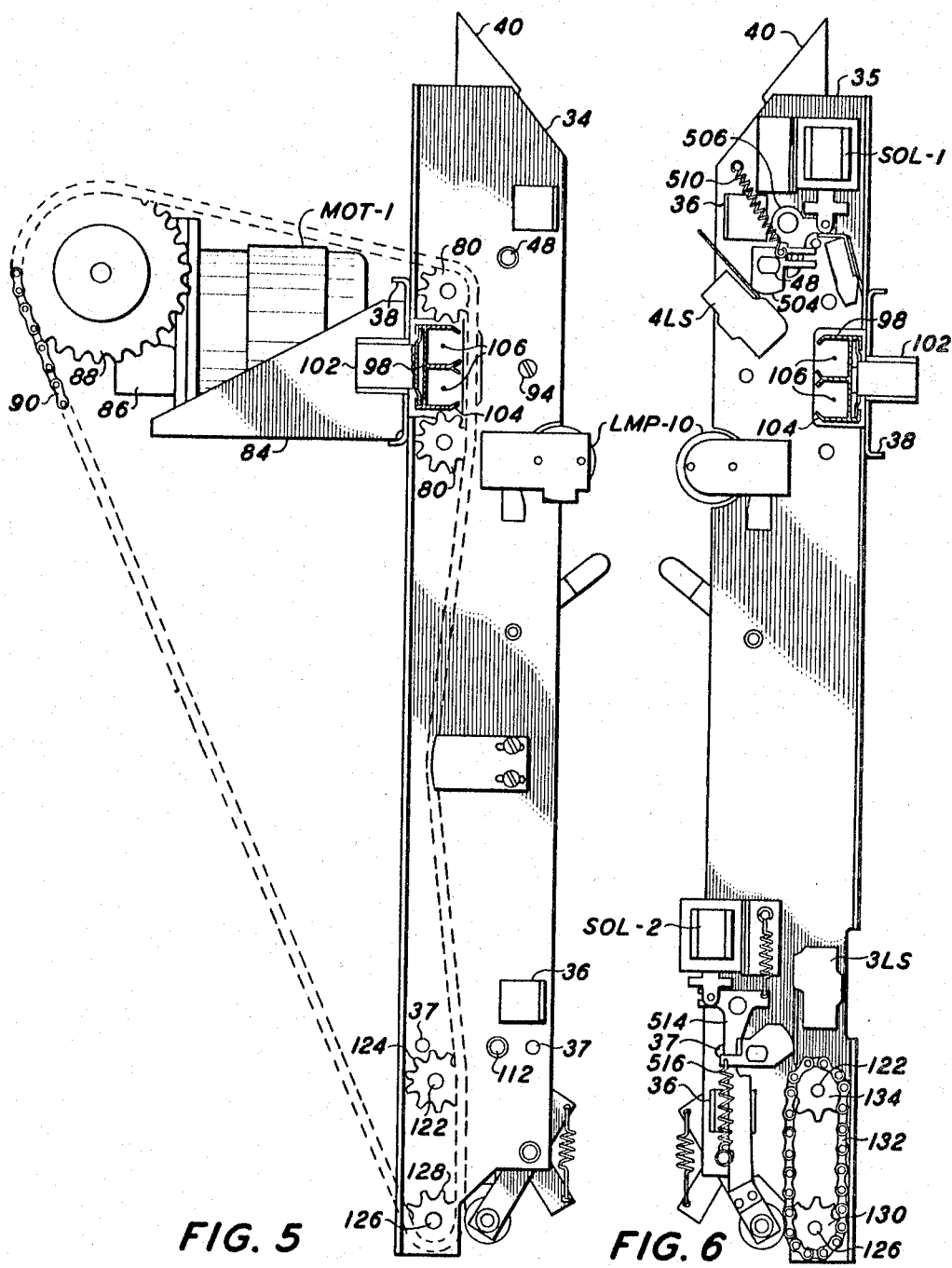

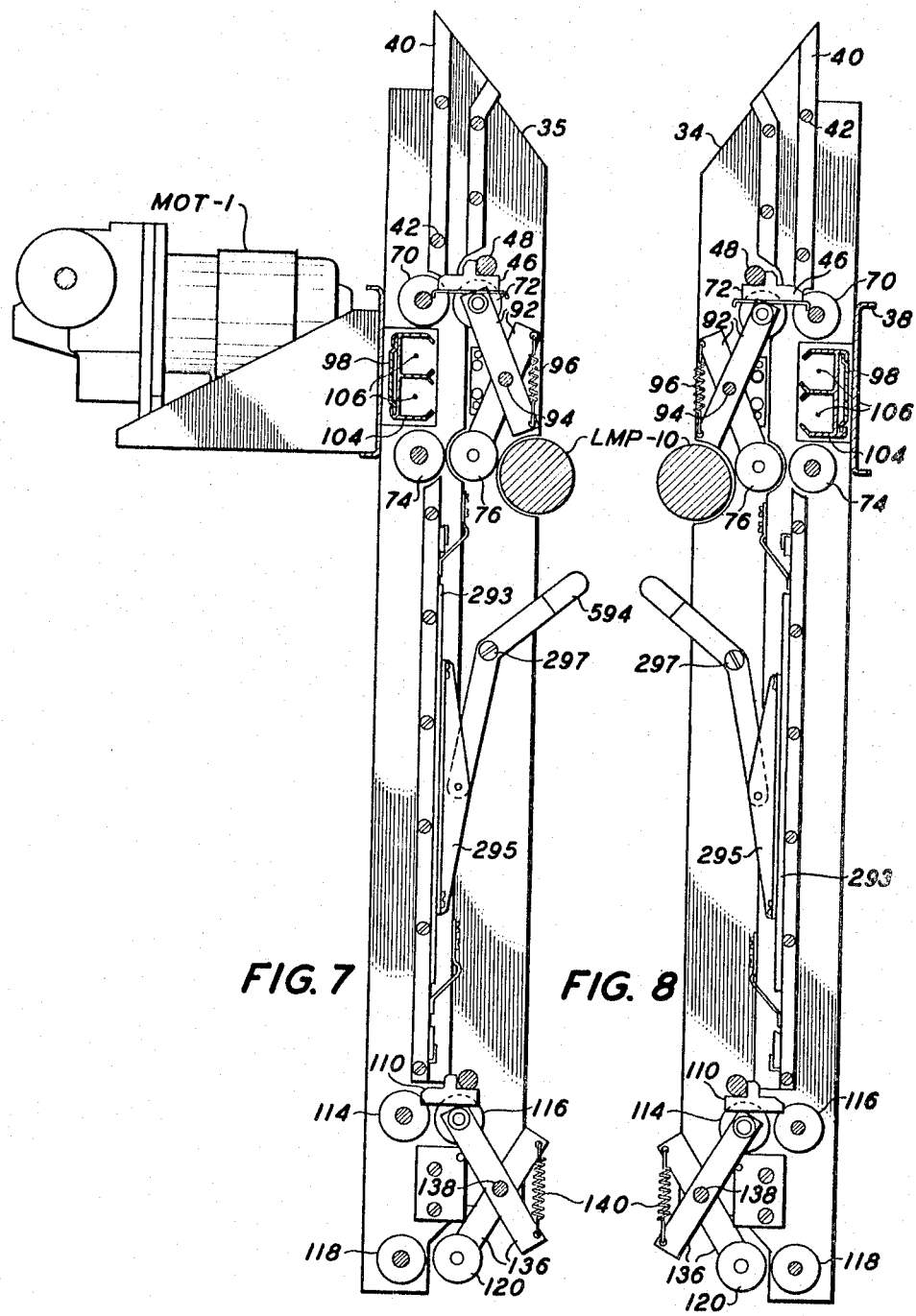

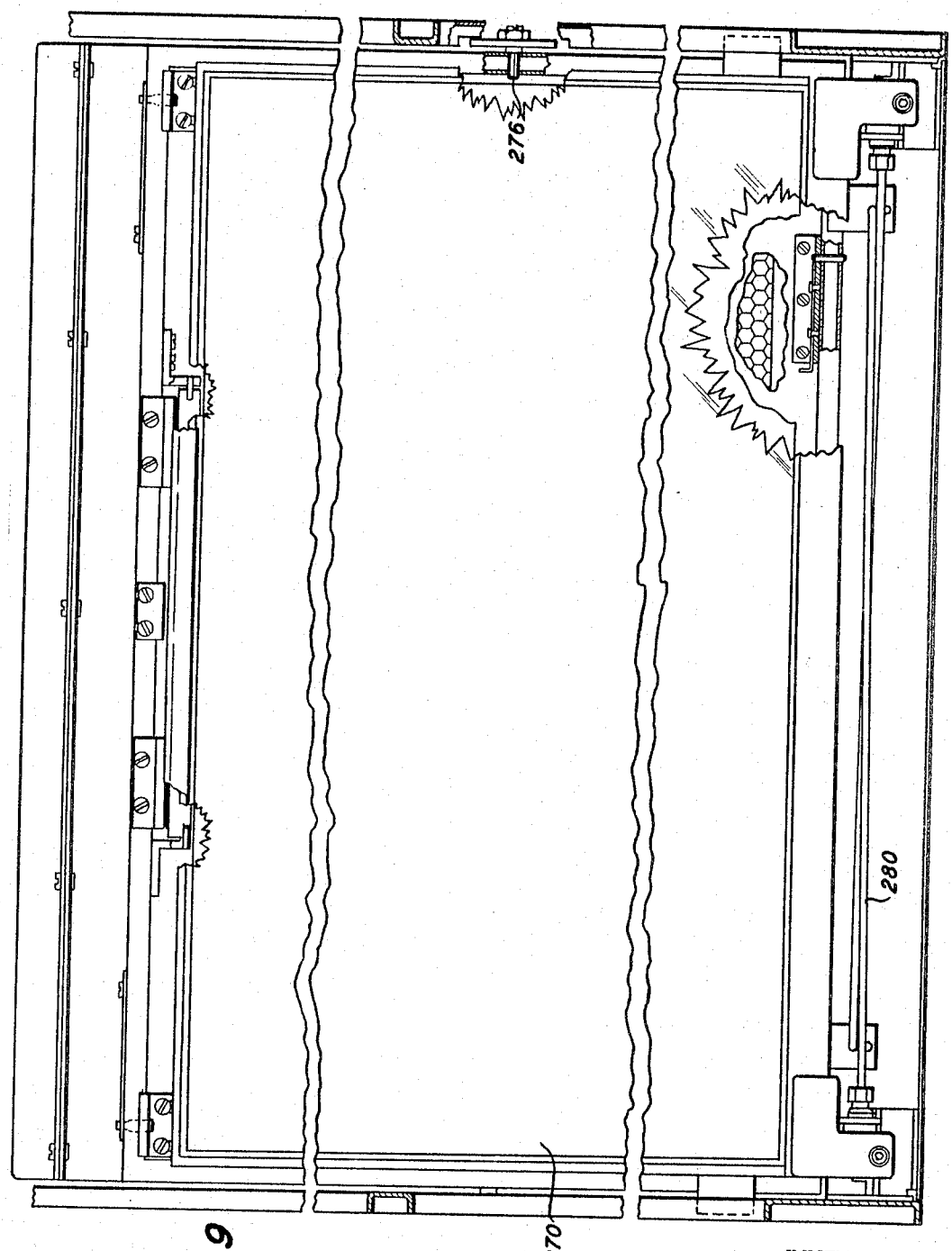

INVENTORS
THOMAS C. MURRAY
RUSSELL R. ROBERTS
BY JOSEPH B. STONE

ATTORNEYS

May 2, 1967 T. C. MURRAY ETAL 3,316,875
XEROGRAPHIC DEVELOPING APPARATUS
Filed March 2, 1964 18 Sheets-Sheet 11

INVENTORS
THOMAS C. MURRAY
RUSSELL R. ROBERTS
BY JOSEPH B. STONE

ATTORNEYS

May 2, 1967 T. C. MURRAY ETAL 3,316,875
XEROGRAPHIC DEVELOPING APPARATUS
Filed March 2, 1964 18 Sheets-Sheet 12

INVENTORS
THOMAS C. MURRAY
RUSSELL R. ROBERTS
BY JOSEPH B. STONE

ATTORNEYS

May 2, 1967  T. C. MURRAY ETAL  3,316,875
XEROGRAPHIC DEVELOPING APPARATUS
Filed March 2, 1964  18 Sheets-Sheet 14

INVENTORS
THOMAS C. MURRAY
RUSSELL R. ROBERTS
BY JOSEPH B. STONE
ATTORNEYS

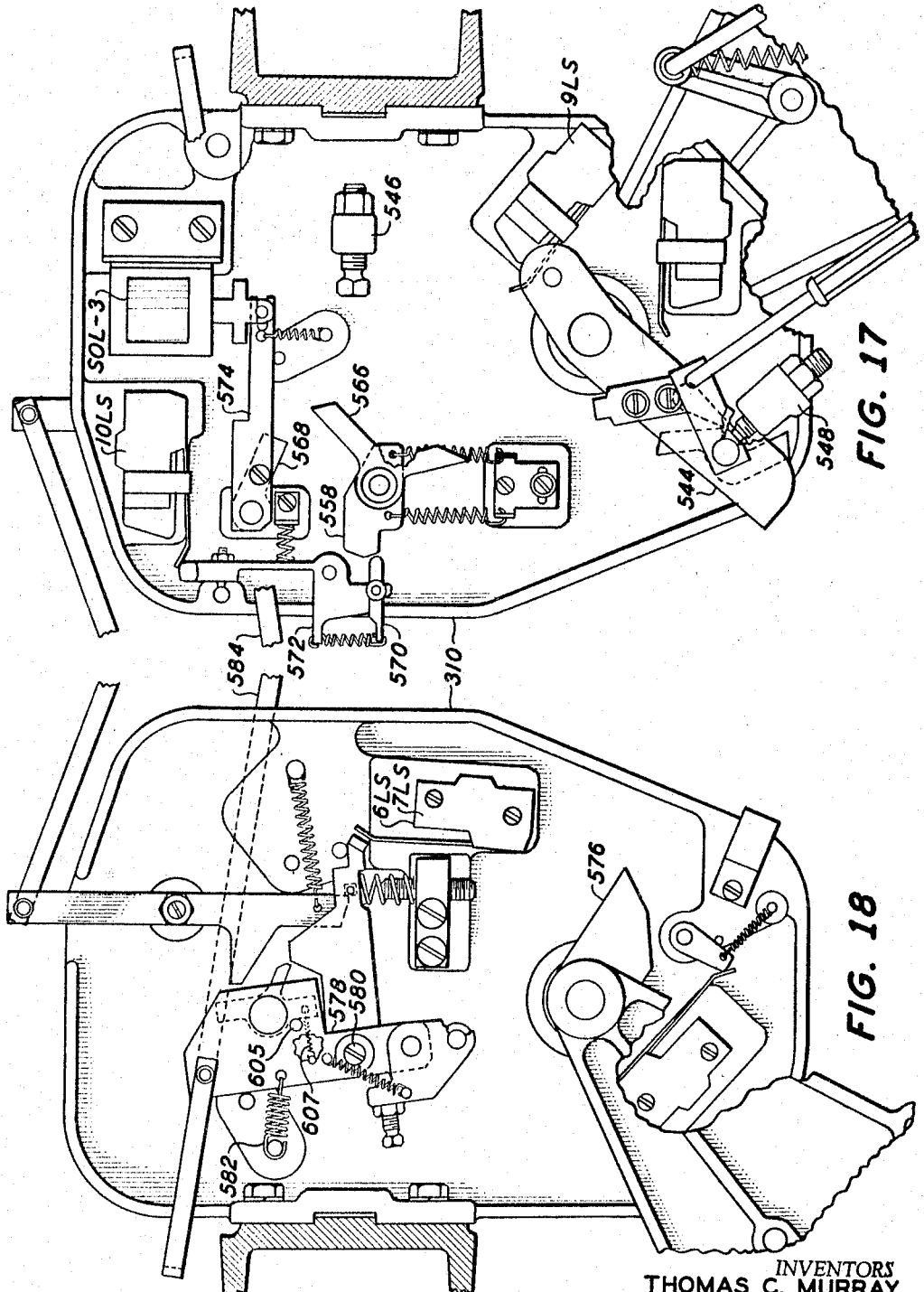

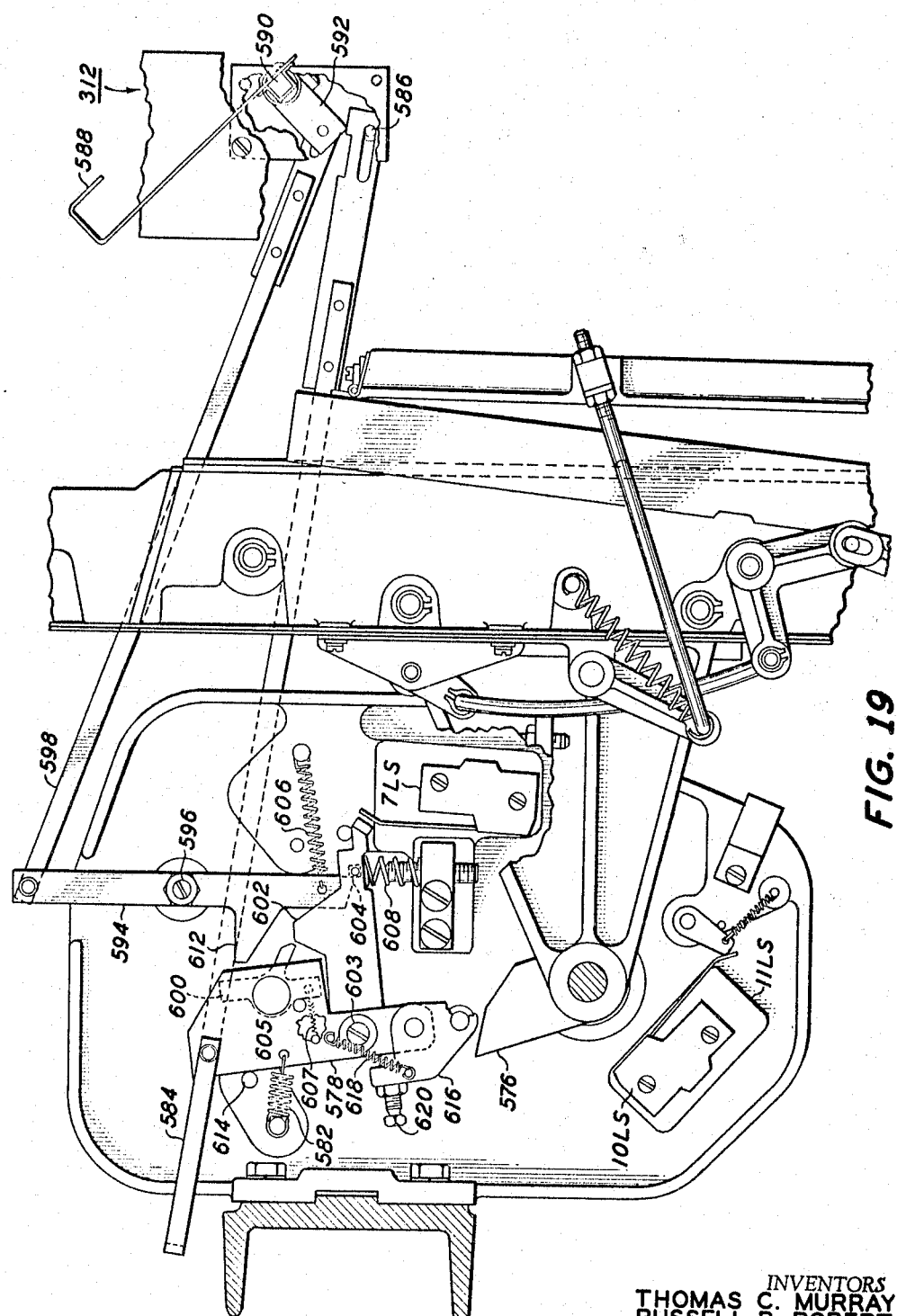

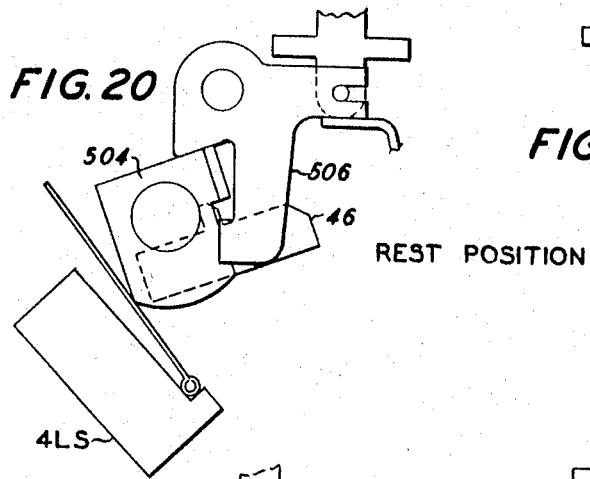
FIG. 20
REST POSITION
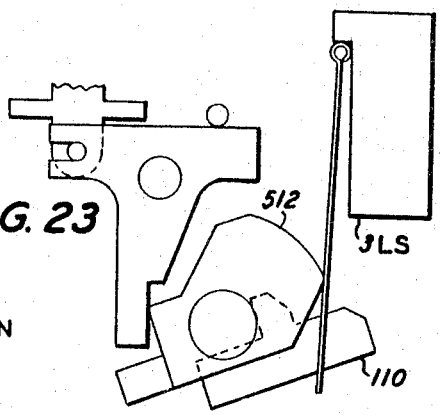
FIG. 23
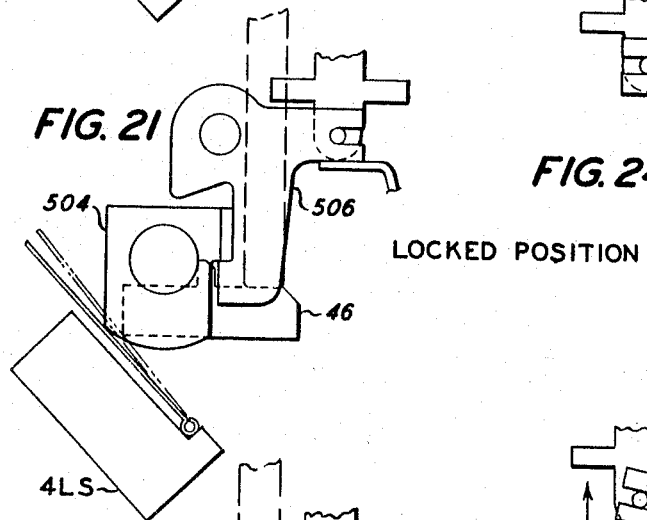
FIG. 21
FIG. 24
LOCKED POSITION
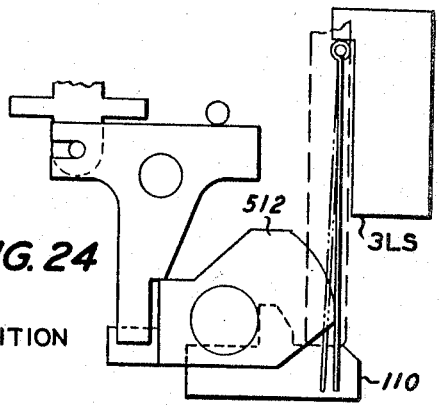
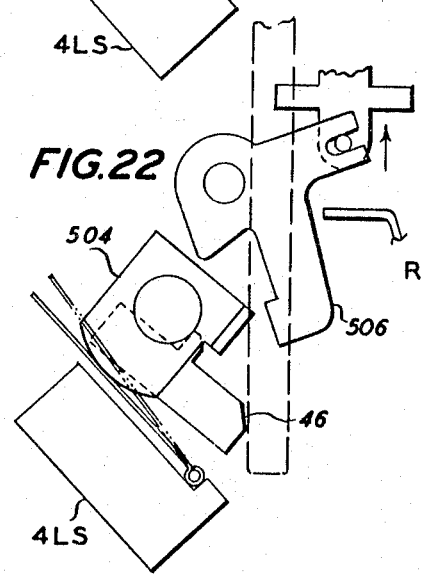
FIG. 22
RELEASE POSITION
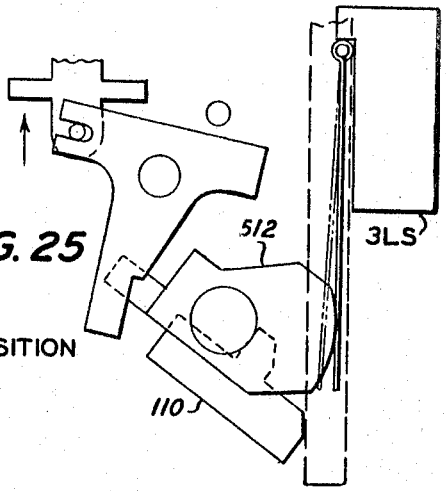
FIG. 25

May 2, 1967

T. C. MURRAY ET AL 3,316,875

XEROGRAPHIC DEVELOPING APPARATUS

Filed March 2, 1964

INVENTORS
THOMAS C. MURRAY
RUSSELL R. ROBERTS
BY JOSEPH B. STONE

ATTORNEYS

United States Patent Office 3,316,875
Patented May 2, 1967

3,316,875
XEROGRAPHIC DEVELOPING APPARATUS
Thomas C. Murray, Rochester, Russell R. Roberts, Ontario, and Joseph B. Stone, Penfield, N.Y., assignors to Xerox Corporation, Rochester, N.Y., a corporation of New York
Filed Mar. 2, 1964, Ser. No. 348,480
3 Claims. (Cl. 118—6)

This invention relates to xerographic developing apparatus and, particularly, to automatic developing apparatus of the type wherein both tone and line copy may be developed.

In the process of xerography, for example, as disclosed in Carlson Patent 2,297,691, issued Oct. 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided developing material or toner which is brought into surface contact with the photoconductive layer and is held thereon electrostatically in a pattern corresponding to the electrostatic latent image. Thereafter, the developed xerographic powder image is usually transferred to a support surface such as paper to which it may be fixed by any suitable means.

One of the methods in common use for developing the electrostatic latent image is described in Walkup Patent 2,618,551 and is known as cascade development. In this technique, the powder or toner is mixed with a granular "carrier" material, and this two-component "developer" is poured or cascaded over the plate surface. The function of the carrier material is to improve the flow characteristics of the powder and to produce, on the powder, by triboelectrification, the proper electrical charge so that the powder will be attracted to the image. More exactly, the function of the carrier material is to provide the mechanical control to the powder, or to carry the powder to an image surface and, simultaneously, to provide homogeneity of charge polarity.

In the Carlson patent it is noted that a variety of types of finely divided electroscopic powders may be employed for developing electrostatic latent images. However, as the art of xerography has progressed, it has been found preferable to develop images with a powder or toner formed of any of a variety of pigmented thermoplastic resins that have been specifically developed for the purpose.

In the production of line copy a toner material of a predetermined concentration is used to produce the desired development of images. In the production of tone copy a different toner concentration is found desirable.

It is particularly advantageous to be able to produce both tone and line copy in the same developing apparatus without having to change the developer material. It is also desirable to be able to regulate the angle at which the developer material is cascaded over the plate surface for either tone or line copy.

It is therefore the primary object of this invention to improve xerographic developing apparatus to permit development of tone and line copy in the same apparatus.

It is also an object of this invention to improve xerographic developing apparatus to permit automatic adjustments to be made in the apparatus to vary the angle of cascade and the amount of time that the toner is cascaded over the xerographic plate.

It is a further object of this invention to improve xerographic developing apparatus to allow different developer materials to be used to develop tone or line copy without having to change the developer material in the developing apparatus.

It is a further object of this invention to improve the quality of copy reproduced in automatic xerographic reproducing machines.

These and other objects of this invention are attained by means of a developer housing having two or more developer pods adapted to hold various size developer materials and means to rotate the developer housing to cascade the developer material over a xerographic plate and control means to regulate the angle of cascade and the time that the developer material is cascaded over the plate for either tone or line copy.

For a better understanding of the invention as well as other objects and further features thereof, reference is had to the following detailed description of the invention to be read in connection with the accompanying drawings, wherein:

FIG. 5 is a left side detail view of the plate transport system shown in FIG. 4;

FIG. 6 is a right side detail view of the plate transport system shown in FIG. 4;

FIG. 7 is a sectional view of the plate transport system taken along lines 7—7 of FIG. 4;

FIG. 8 is a sectional view of the plate transport system taken along lines 8—8 of FIG. 4;

FIG. 9 is a rear detail view of the copyboard;

FIG. 17 is a right side view of the control panel with the elements thereof shown in their proper orientation when the developer apparatus is in to the first cascade position;

FIG. 18 is a left side view of the control panel with the elements thereof shown in their proper position when the developer apparatus is in to the first cascade position;

FIG. 19 is a left side view of the control panel and a portion of the developer apparatus and locking mechanism with the elements of the control panel shown in their position when the developer apparatus is in a plate receiving position;

FIGS. 20–25 are detailed views of the xerographic plate stops used in the plate transport system shown in their various operating positions;

Figure 1:
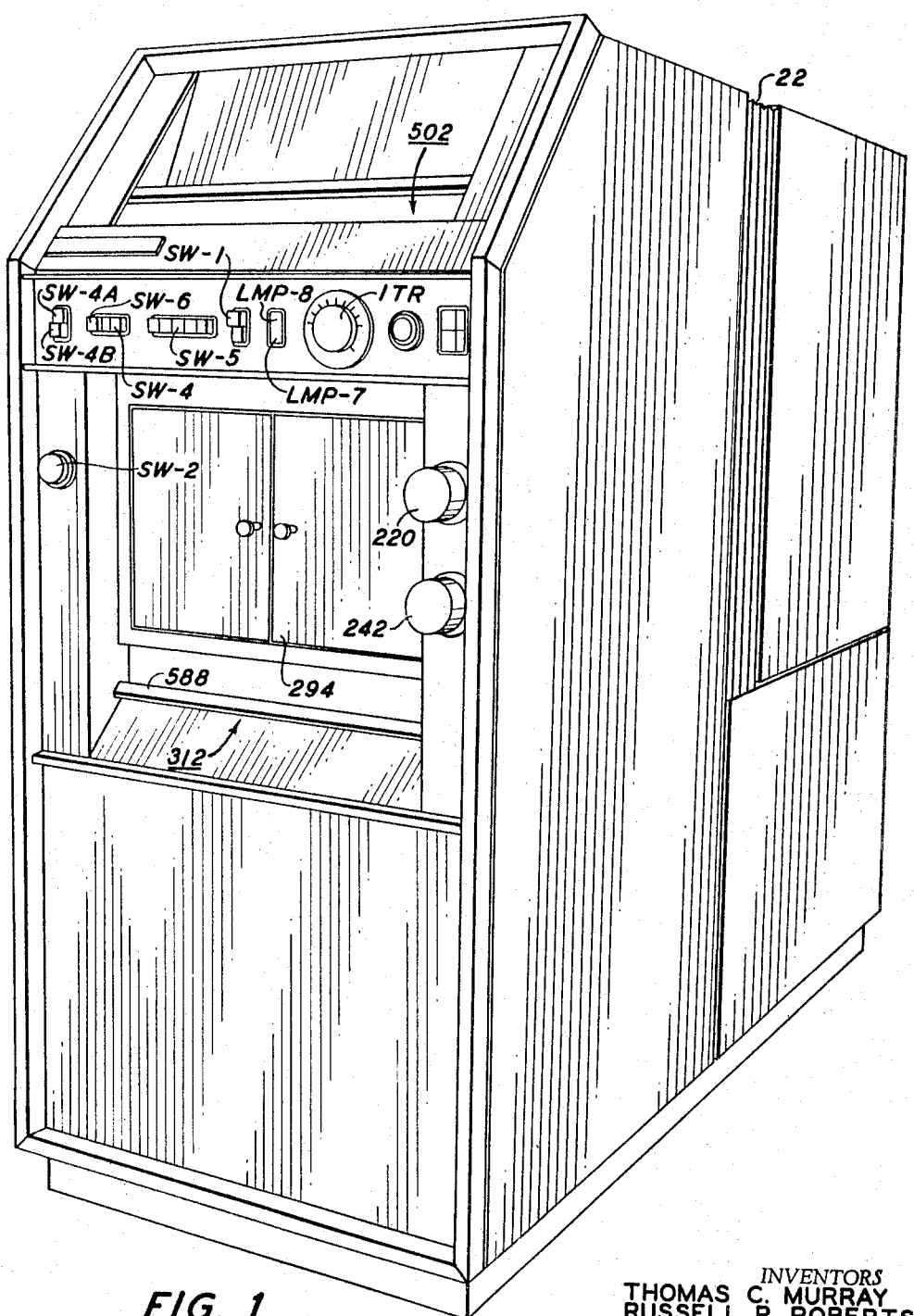
FIG. 1 is a right-hand perspective view of a xerographic camera embodying the present invention.
Figure 2:
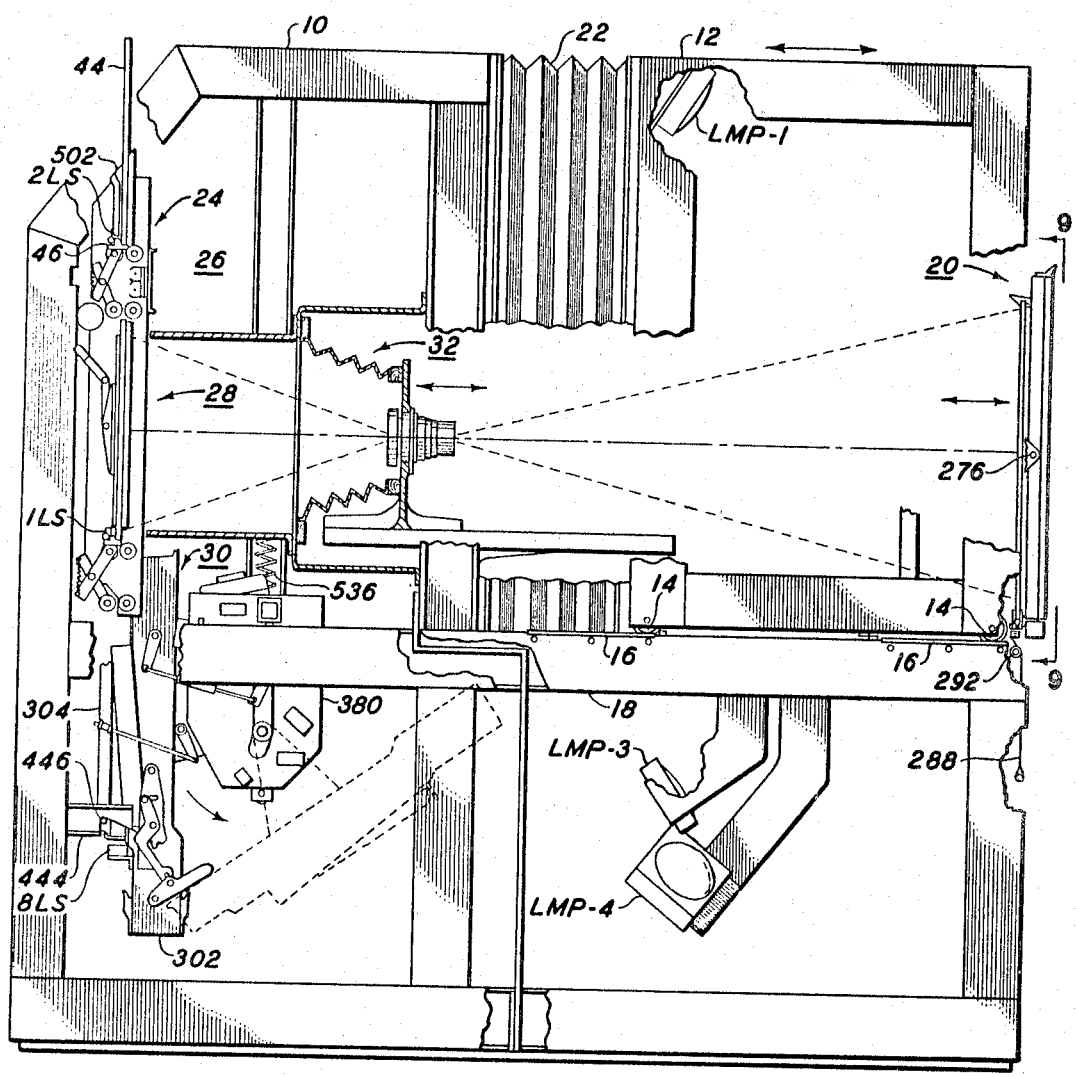
FIG. 2 is a right-hand side view of the xerographic camera shown in FIG. 1 with the side panels removed and portions broken away to show the internal structure of the apparatus.
Figure 3:
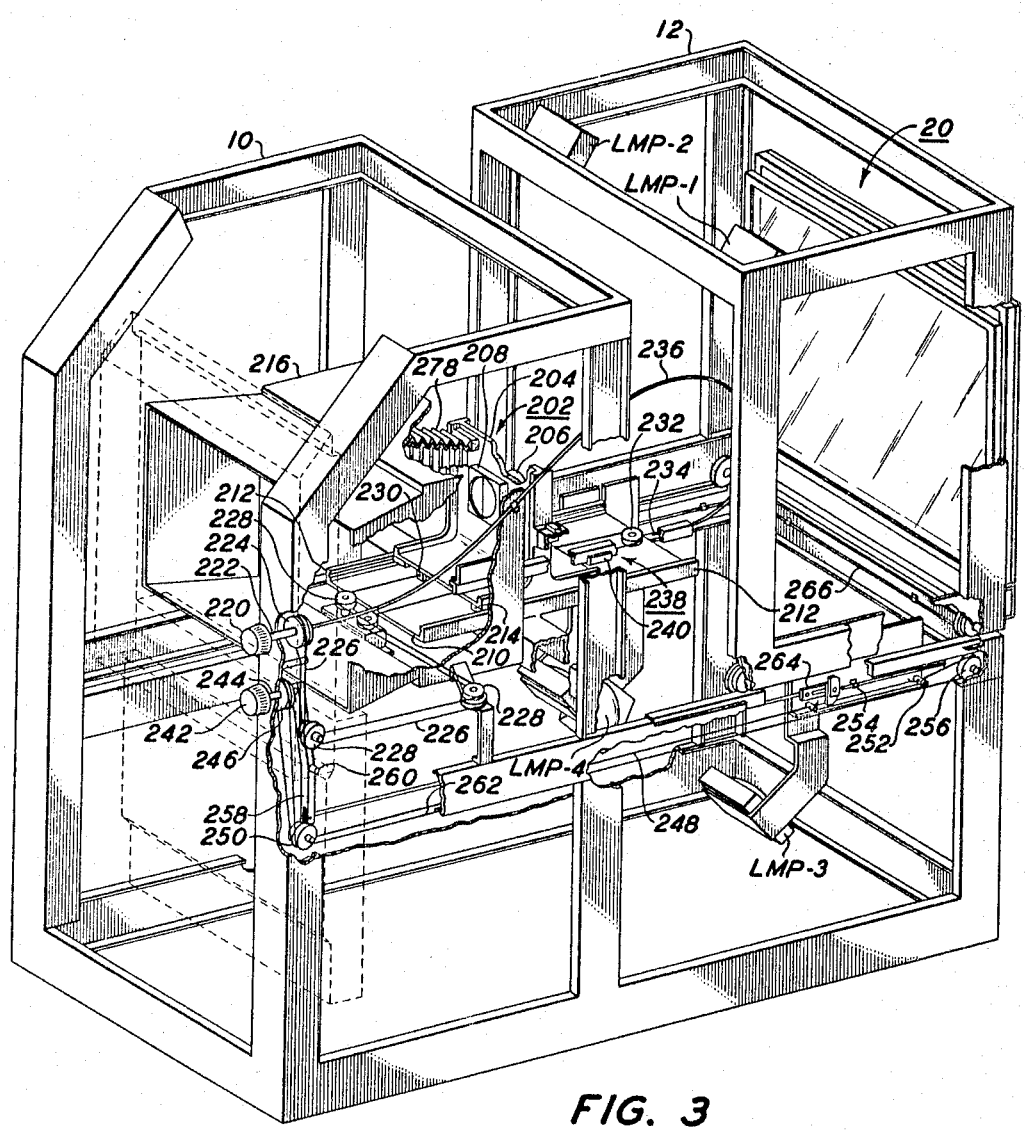
FIG. 3 is a right-hand perspective view of the xerographic camera shown in FIG. 1 with the cover panels removed and portions broken away to show the internal structure of the lens system.
Figure 4:
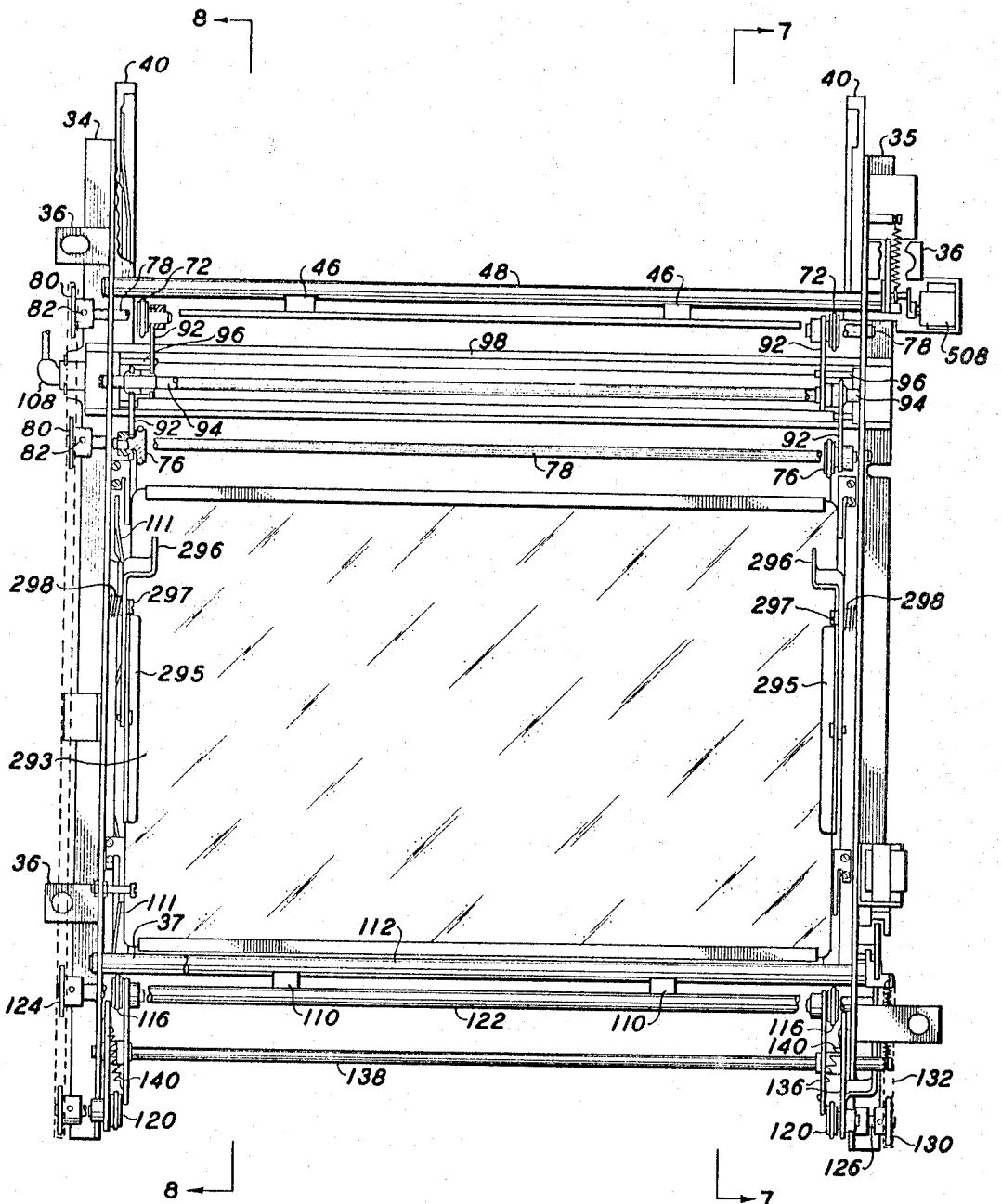
FIG. 4 is a front detail view of a xerographic plate transport system.

Referring to FIGS. 1 through 3 there is shown a superstructure or main frame 10, a moveable frame portion 12, and external cover panels, which enclose the entire machine. The moveable frame 12 is supported on both sides on rollers 14 which ride in tracks 16 on longitudinal frame members 18 constituting part of the main frame 10. The moveable frame 12 supports a copyboard assembly generally designated 20 for supporting an original document that is to be reproduced. The moveable frame 12 is positionable along the tracks 16 so that the position of a document on the copyboard relative to the other internal members of the apparatus may be varied for image enlargement or reduction purposes. The moveable frame 12 is connected to the stationary frame 10 by a light tight flexible bellows 22 so that the entire assembly is light tight throughout the entire length of travel of the moveable frame 12.

The stationary frame 10 encloses a xerographic plate transport system 24; a plate developing system 30; and a moveable lens system 32; and the transport system contains a plate charging station 26 and a plate exposure station 28. The transport system, the developing system, and the lens system are described in detail below.

Plate transport system

A pair of transport frame members 34 and 35 are supported from the stationary frame 10 by mounting members 36 in any manner suitable to permit relative adjustments of the transport frame to the stationary frame. The frame members 34 and 35 are held in relative alignment by a pair of spacer rods 37 and a channel member 38. A pair of plate guides or tracks 40 are secured to the inside surface of the frame members 34 and 35. The plate guides 40 are shown herein as channel-shaped members, secured to the transport frames by screws 42, containing cut out portions to accommodate the apparatus of the transport system.

A xerographic plate 44 may be inserted between the transport frames 34 and 35 in the plate guides 40 as shown in FIG. 2. The plate will move freely downward in the guides 40 until it comes to rest upon a pair of stops 46 secured on a stop shaft 48 journaled in the frame members 34 and 35. The stop shaft 48 may be rotated to remove the stops 46 from the path of movement of the plate 44 by means of the operation of solenoid SOL–1.

When the stops 46 are removed from the path of the movement of the plate 44 the plate is carried downward by gravity and is engaged by a first set of drive rollers 70 and pinch rollers 72. The plate is then driven downward past charging station 26 by the drive rollers 70 into contact with a second set of guide rollers 74 and the pinch rollers 76. The drive rollers 70 and 74 are mounted on drive shafts 78, journaled in side frames 34 and 35. The drive rollers are mounted on each end of the drive shafts on the inside of the side frames so that the rollers contact the outer edge of the xerographic plate surface. The shafts 78 extend through the side frame 34 and contain sprockets 80 secured thereon by pins 82. A motor MOT–1, mounted on a bracket 84 which in turn is secured to the spacer channel 38 drives the sprockets 80 through gear box 86, main drive sprocket 88, and main drive chain 90 to produce the driving force of drive rollers 70 and 74.

The pinch rollers 72 and 76 are rotatably journaled in a pair of pivot arms 92. The pivot arms 92 are moveable about a shaft 94 which extends between the side frames 34 and 35. A tension spring 96 is secured to each set of pivot arms 92 at the opposite end of the pivot arm from the pinch rollers 72 and 76. The tension spring 96 causes the pivot arms 92 to pivot about shaft 94 and force the pinch rollers 72 and 76 toward the drive rollers 70 and 74 respectively. A xerographic plate between the drive rollers and pinch rollers is forced against the drive roller by the pinch roller so that movement is imparted from the drive roller to the xerographic plate.

A two wire charging corotron 98 is secured to the motor mount bracket 84 by corotron mounting brackets 102 between the drive rollers 70 and 74. The corotron consists of a shield member 104 and a pair of charging wires 106. Electrical power is supplied to the charging wires through electrical connection 108 from a suitable source of power.

The xerographic plate is moved by the drive roller at a uniform speed past the corotron 98 at charging station 26 and a uniform electrostatic charge is placed on the plate surface by the corona discharge of wires 106.

After the plate 44 passes the charging station 26 it is continuously moved downward by the drive rollers 74 into the exposure station 28. The plate comes to rest in the exposure station on a pair of mechanical stops 110. The plate is positioned laterally in the exposure station by a leaf spring 111 mounted inside one of the guides 40 so that the plate is forced against the opposite guide 40. With the plate resting on stops 110 and abutting one of the guides 40 the surface of the plate containing the electrostatic charge is in position to be exposed to a light image of the document being reproduced, as best seen in FIG. 2.

The mechanical stops 110 are secured to stop shaft 112 which is journaled in the side frames 34 and 35. After exposure stop shaft 112 is rotated by solenoid SOL–2 to remove the stops 110 from the path of the xerographic plate. Removal of the stops 110 from the flow path of the plate 44 permits the plate to drop down into driving contact with a third pair of drive rolls 114 and pinch rolls 116 from which it is driven downward through a fourth set of drive rolls 118 and pinch rolls 120. The drive rolls 114 are mounted on a drive roll shaft 122 journaled in the side frames 34 and 35 and contains a sprocket 124 secured to one end thereof in drive engagement with the main drive chain 90. The fourth set of drive rolls 118 are mounted adjacent to the side frames 34 and 35 on a pair of stub shafts 126. The stub shafts 126 are secured and journaled in the side frames 34 and 35. The stub shaft 126 which is journaled in the side frame 34 contains a sprocket 128 which is in engagement with the main drive chain 90. The stub shaft 126 which is journaled in the side frame 35 contains a sprocket 130 which engages a secondary drive chain 132. Mounted on the opposite end of the drive roll shaft 122 from the drive sprocket 124 is a second sprocket 134 which also engages the secondary drive chain 132. Power is transmitted from the motor MOT–1 through the main drive chain 90 to the third set of drive rolls 114 by means of sprocket 124 and shaft 122. Power is also transmitted from the motor MOT–1 through the chain 90 to one of the fourth set of drive rolls 118 by means of sprocket 128 and one of the stub shafts 126. Power is supplied to the other drive roll 118 from drive chain 90 through sprocket 124 to shaft 122 to sprocket 134 and secondary drive chain 132. The secondary drive chain 132 drives the sprocket 126 on the other stub shaft 126 and drives the drive roll 118. The pinch rolls 116 and 120 are rotatably mounted on pairs of pivot arms 136 in the same manner as are the pinch rolls 72 and 76. The pivot arms 136 are pivotally mounted on pivot shaft 138 and are urged towards the drive rolls by means of tensioning springs 140 connecting the ends of the pivot arms opposite from the pinch rollers. When the plate 44 is between the drive rollers and the pinch rollers the pinch rollers force the plate 44 against the drive roller to be driven thereby.

Lens system and copyboard

In order to produce enlargements or reduction in the size of the copy produced from an original document, the lens system and the copyboard are both moveable relative to position of the xerographic plate in the exposure station. As seen in FIG. 3 a lens assembly 202 containing a lens support frame 204, a lens retaining ring 206 and a shutter assembly 208 is slideably mounted on a support plate 210. The support plate 210 has a pair of parallel guide rails 212 extending in line between points intermediate the exposure station and the copyboard. A pair of runners 214 extend along the bottom of the support plate 210 in mating relationship with the guide rails 212. The support frame 204 can be moved on the rails 212 to various points intermediate the exposure station and the copyboard. The lens retaining ring 206 is supported in an opening in the support frame 204 and contains a focusing lens to focus an image from the copyboard onto a xerographic plate at the exposure station. The shutter assembly 208 is mounted on the opposite side of the support frame in line with the lens to control the time that the xerographic plate is exposed to the light image.

An enclosed light shield 216 is suspended from the frame 10 and extends between the exposure station and the lens assembly. The light shield prevents extraneous light from reaching the surface of the xerographic plate. To further prevent light from reaching the xerographic plate a flexible bellows 218 is secured at one end to the light shield 216 and at the other end to the lens support frame 204. Movement of the lens assembly 202 and the support frame 204 is taken up by expansion or contraction of the bellows 218.

A control knob 220 mounted on the front of the machine controls the movement and position of the lens assembly 202. The control knob 220 is mounted on one end of a rotatable shaft 222 which has a capstan type pulley 224 mounted on the other end. A wire cable 226 is wrapped around the pulley 224 and both ends of the cable extend downward around a series of direction changing pulleys 228 to the lens assembly 202. One end of the cable 226 is secured to a block 230 on the side of the lens support frame closest to the exposure station. The other end of the cable 226 extends beneath the lens support frame and around a pulley 232 so that the cable is doubled back. This end of the cable is fastened to the side of the support frame nearest the copyboard. Rotation of the knob 220 produces rotation of the capstan pulley 224 and corresponding movement of the cable 226. Movement of the cable produces movement of the lens assembly 202 by pulling it towards the exposure station when the knob is rotated in the other direction. Thus the position of lens assembly may be controlled from the front of the machine.

The knob 220 and the shaft 222 are slidebaly moveable in a longitudinal direction that is, the knob and shaft may be pulled out or pushed in towards the machine. A locking cable 234 is secured to the end of the shaft 222 and is encased within a cable shield 236. The opposite end of the locking cable 234 is attached to a locking device 238. As the knob 220 is pulled out of the machine the cable 234 moves a mechanism which presses a brake shoe 240 against the side of the lens support frame 204 securing the frame in a stationary position. After adjusting the position of the lens assembly by rotating the knob 220 for the desired enlargement or reduction of the copy to be reproduced the knob 220 is pushed into the machine actuating the locking mechanism 238 securing the lens assembly in that position during exposure.

Figure 10:
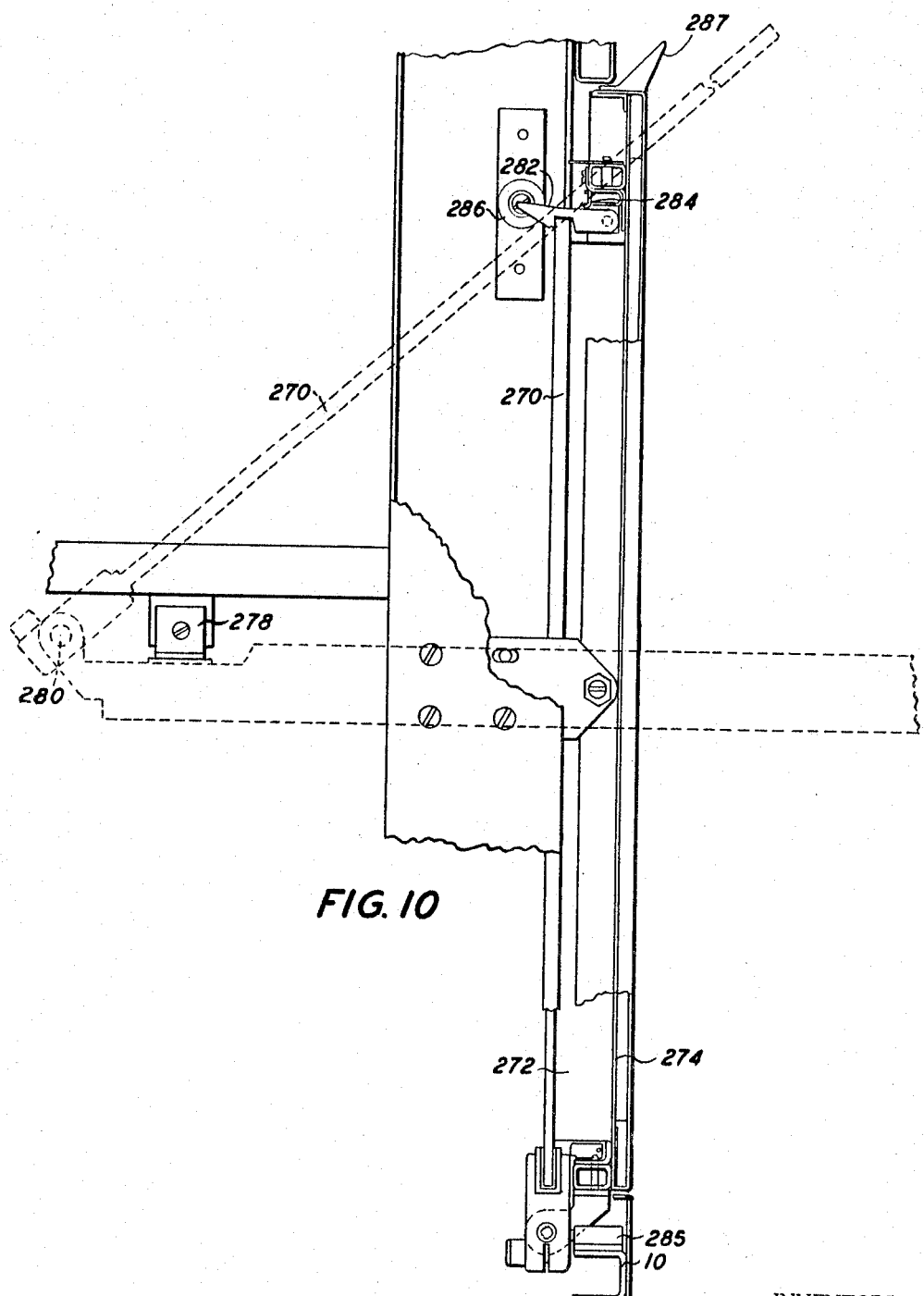
FIG. 10 is a left side view of the copyboard shown in FIG. 9 with the copyboard shown in the horizontal position in dotted lines.

The movement of the copyboard 20 and moveable frame 12 is controlled by adjustment of knob 242 mounted directly beneath the knob 220 on the front of the machine. The knob 242 is secured to a shaft 244 mounted in the frame 10 which also has a capstan type pulley 246 mounted thereon. A cable 248 is wrapped around the pulley 246 and extends around a pair of pulleys 250. One end of the cable 248 is secured to a pin 252 fastened to a bracket 254 which is mounted on the moveable frame 12. The other end of the cable 248 passes beneath pin 252 around pulley 256 back to the pin 252 to which it also is secured. Rotational movement of the knob 242 turns the pulley 246 and produces movement of the cable 248. Rotation of the knob in one direction will exert force through one end of the cable on to the pin 252 which causes the moveable frame 12 and the copyboard to advance towards the exposure station. Movement of the knob 242 in the opposite direction will result in the end of the other end of the cable exerting a force on the pin 242 to move the frame 12 and the copyboard away from the exposure station. The knob 242 and the shaft 244 will also move longitudinally in and out of the frame 10. A lock arm 258 is pivoted about a pin 260 mounted in a frame member and has one end secured to the shaft 244. The other end of the arm 258 has one end of the cable 262 secured thereto. The other end of the cable 262 is secured to a locking device 264 mounted on one side of the machine. As the knob 242 is pulled out from the machine the arm 252 pivots about pin 260 releasing pressure from cable 262 permitting the locking device 264 to clamp a brake shoe against the bracket 254 tending to lock the frame 12 in stationary position. As the knob 242 is pushed into the machine the arm 258 applies tension to the cable 262 which in turn releases the locking device 264. A second cable 266 is also secured at one end to the locking device 264 and extends around the frame 12 to a similar locking device (not shown) on the opposite side of the machine. Thus the position of the moveable frame 12 and the copyboard 20 may be adjusted by rotating the knob 242 and may be in locked position by longitudinal movement of the knob 242 and the shaft 244. The copyboard 20 mounted on the moveable frame 12 is shown in FIGS. 9 and 10 and consists of a mounting board 268 and a glass plate 270 to support copy on the copyboard. The copyboard 268 consists of a layer of foam rubber or resilient material 272 mounted on a sheet-metal backing 274. The backing material shown herein consists of a honeycomb material sandwiched between two sheets of metal. Copy to be mounted is placed on the foam rubber material 272 and pressed against the foam rubber by the glass plate 270.

The entire assembly 20 is pivoted approximately at its center about point 276 so that the copyboard may lay in a horizontal position as shown by the dotted lines in FIG. 10. When in the horizontal position the copyboard abuts a stop 278 and the glass 270 may be pivoted about a pair of torsion bars 280 to the position shown in the dotted lines in FIG. 10. With this orientation of the copyboard and glass the machine operator may remove copy from the copyboard and position new copy thereon. When the glass is moved down against the copyboard it is locked in position by a catch 282 which is urged into locking position by a leaf spring 284. The copyboard is held in a vertical position by a stationary magnet 285 mounted on the main frame 10 and acting to hold the bottom of the copyboard in position. The operator may move the copyboard to the horizontal position by pulling downward on handle 287 breaking contact with the copyboard and the magnet 285. When the glass 270 is in the open position, as shown by the dotted lines, it abuts a rubber stop 286 which prevents damage to the glass when the glass is opened under the action of the torsion bars 280. The torsion bars 280 assist in the opening of the glass 270 and hold the glass in an open position while the operator changes the copy in the copyboard.

A light shield or curtain 288 containing a weight 290, at the bottom thereof, is attached to the bottom of the copyboard so that, as the copyboard is moved towards the lens system, the curtain 288 is drawn over a roller 292 preventing light from entering the exposure portion of the main frame 10.

A viewing platen 293 is mounted at the exposure station and is accessible from the front of the machine through the folding doors 294. The viewing platen when used in conjunction with a focusing lamp LMP–5, as described below, permits viewing and focusing of the image of the document being reproduced. The viewing glass is mounted in a pair of brackets 295 and is moved from a viewing position to an inoperative position by a pair of levers 296. The levers 296 are pivoted about pin 297 by torsion springs 298 tending to force the glass into the path of movement of the xerographic plate so that the surface of the glass is in the same position as the surface of the xerographic plate. When the doors 294 are closed they actuate the levers 296 pivoting the levers against the action of the springs 298 moving the platen out of the path of the xerographic plate.

*Developing apparatus*

After the xerographic plate 44 is electrostatically charged and exposed to a light image of the copy being reproduced it is transported by means of drive rollers 118 to the developing system 30. The developing apparatus develops an electrostatic latent image which is produced on the plate surface at the exposure station by cascading developer material over the surface of the plate. The developer material consists of carrier particles and toner material. The toner material consists of a powder formed of a pigmented resin which will adhere electrostatically to the previously formed electrostatic latent image areas on the plate to form a visible xerographic powder image. The carrier particles are granule particles much larger in size than the toner particles and are constructed of a material which is capable of developing a triboelectric charge sufficient to hold toner particles on the carrier particles so that the carrier particles will carry the toner material across the plate surface and deposit toner in the areas on the plate containing electrostatic charge. The xerographic plate 44 is held in the developer housing 302 by means of a plate clamp 304 while the housing is rotated to the position shown in the dotted lines in FIG. 2. When the developer housing 302 is rotated to the position shown by the dotted lines the developer material located in the bottom of the housing cascades across the plate surface depositing toner material in the electrostatically charged areas. Upon return of the developer housing to a second cascade position, not shown but described below, the developer material cascades back across the plate surface to the bottom of the developer housing 302 again depositing toner material in the electrostatically charged areas.

Figure 11:
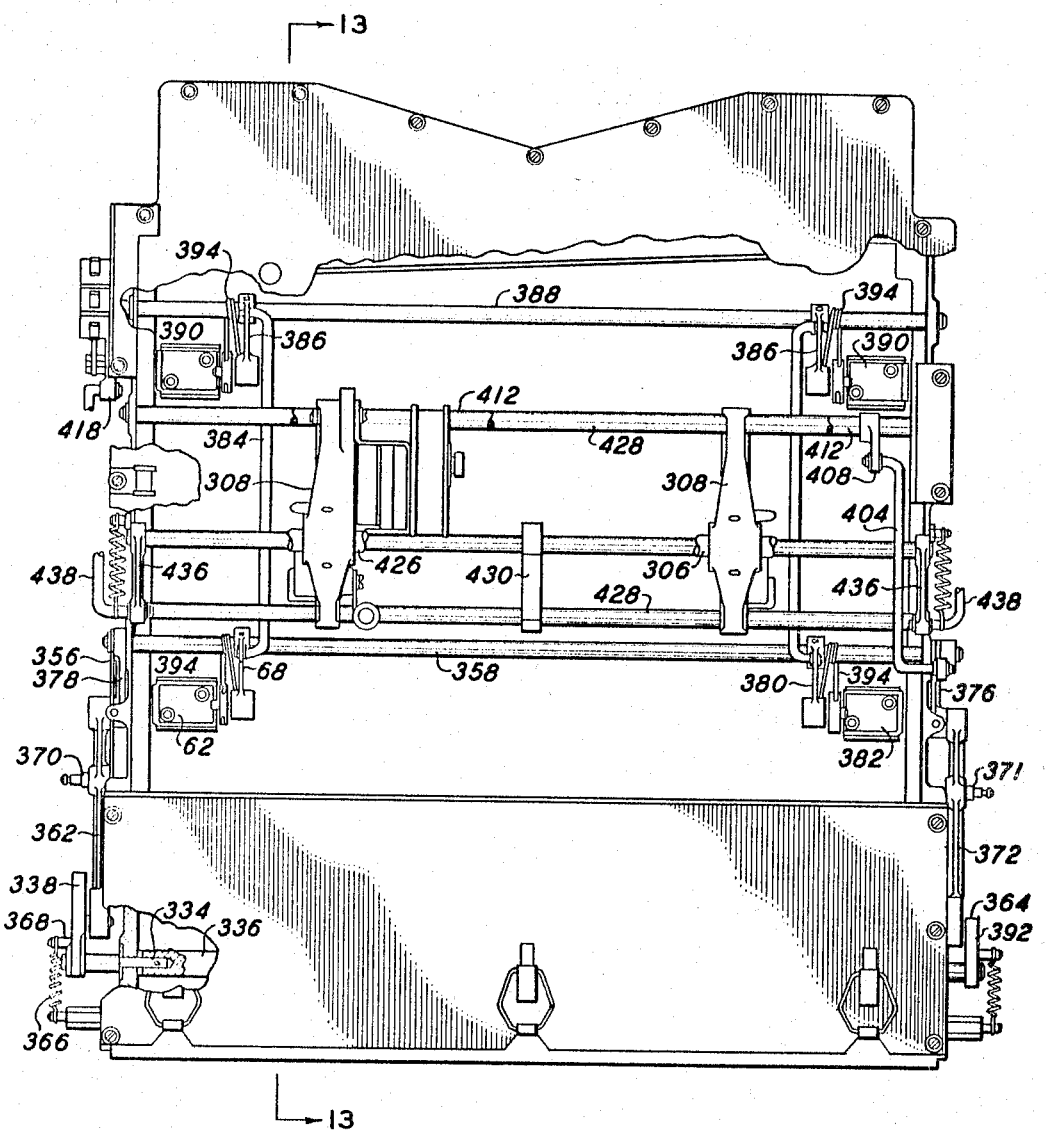
FIG. 11 is a rear detailed view of the developer apparatus.
Figure 12:
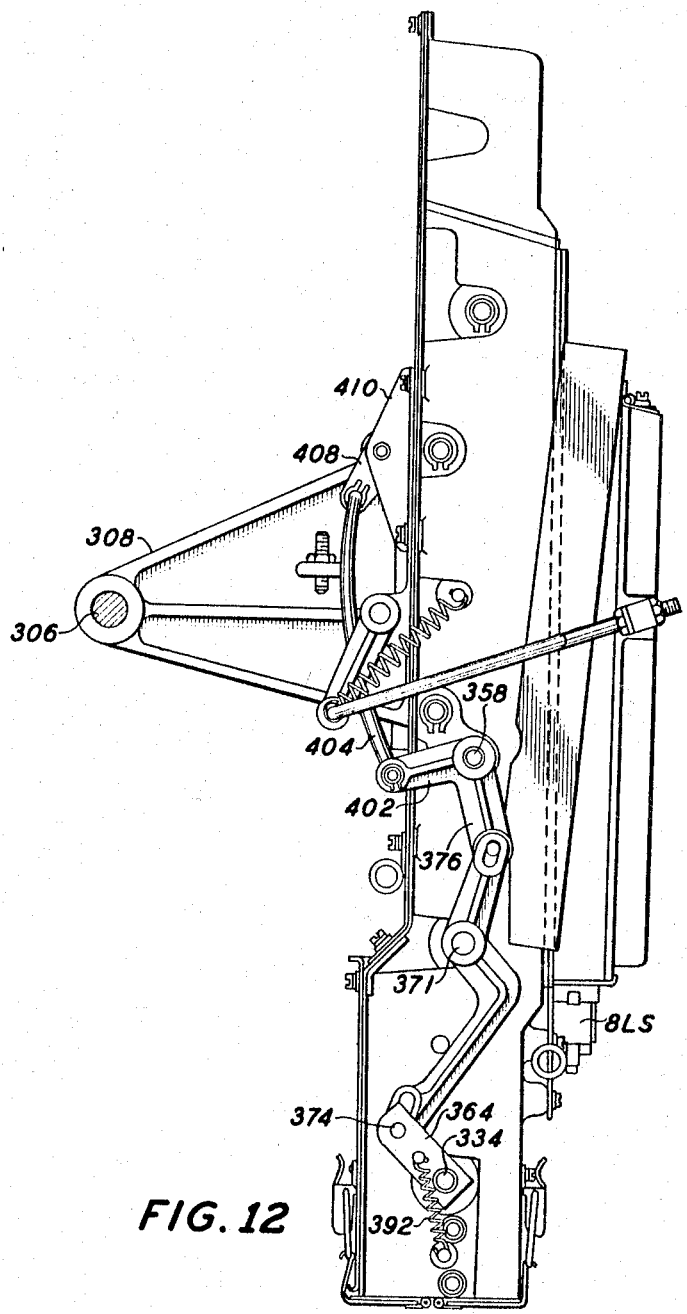
FIG. 12 is a left side detailed view of the developer apparatus.
Figure 13:
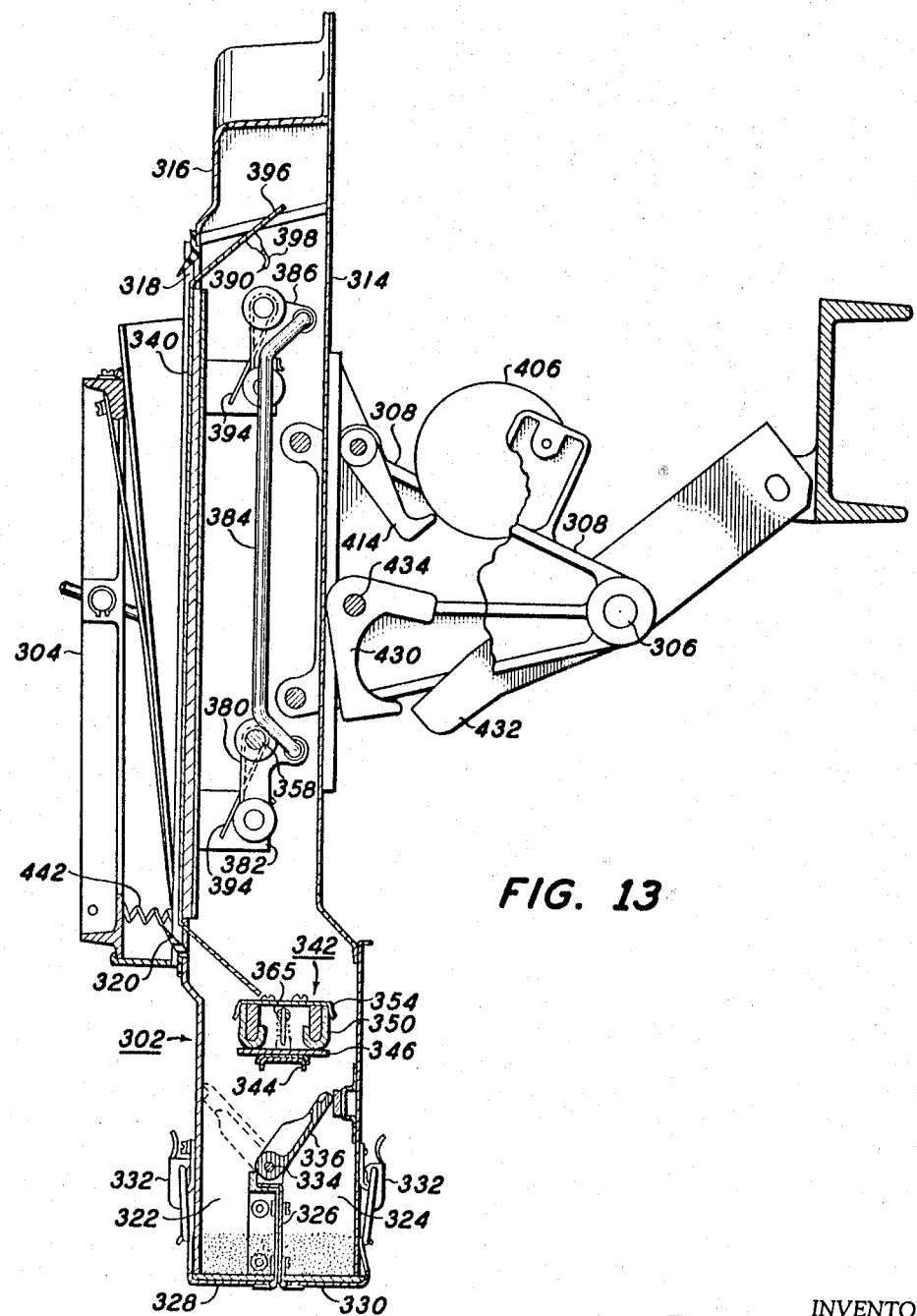
FIG. 13 is a sectional view of the developer apparatus taken along lines 13—13 of FIG. 13.

The developer housing as seen in FIGURES 11, 12 and 13 is suspended from a shaft 306 by means of a pair of pivot arms 308. The arms 308 can be rotated about shaft 306 so that the developer housing is rotated to a first cascade position that is the position shown in the dotted lines in FIG. 2. After the toner has cascaded across the surface of the xerographic plate the developer housing is rotated back to a second cascade position to permit the toner to again cascade down across the surface of the xerographic plate. The position and movement of the developer housing is controlled by a switch plate 310. After the desired or programmed number of cascades has been accomplished the developer housing is moved to an intermediate position, approximately 17° from the vertical to permit the xerographic plate to be removed from the developer housing through a plate door indicated generally as 312. With the plate removed and the door closed, the developer housing is then moved back to the vertical position to receive another xerographic plate for development thereof. The first cascade position and the second cascade position each have two alternative positions for line and tone copy and the amount of hesitation after movement to the cascade position differs for line and tone copy, both of which are described below.

The developer housing 302 consists of a rear panel 314 to which the arms 308 are fastened and a front panel 316 shaped to mate with the rear panel 314 and form the developer housing. The front panel 316 has an opening 318, the same size and shape as the xerographic plate, to permit the photoconductive surface of the xerographic plate to be exposed to the interior of the developer housing. A resilient seal 320 extends around the opening 318 to prevent spillage of developer material when a xerographic plate is pressed into the opening by means of plate clamp 304. At the bottom of the developer housing there are a pair of developer pods 322 and 324 containing developer material. The pods are separated by means of a wall 326 extending the width of the developer housing. The bottom of the developer housing is put into two sections 328 and 330 providing the bottom for each developer pod. The bottom sections 328 and 330 are hinged to the wall 326 and are secured in position by means of clamps 332. The developer material may be removed or changed in each developer pod by disconnecting clamp 332 and permitting the bottom of the developer pod 328 or 330 to pivot downward dropping out the developer material. A shaft 334 is mounted on the top of the wall 326 and contains a cover flap 336 which may be rotated by means of a lever 338, shown in FIG. 16, to alternately cover one of the developer pods.

The developer pod 322 contains developer materials sized for use in developing tone images and the developer pod 324 contains developer materials sized for use in developing line copy. When line copy is being reproduced the developer material is merely cascaded across the surface of the xerographic plate and the toner material is allowed to be deposited in the electrostatic image areas, however, when half-tone images are being reproduced an electrode plate such as that shown at 340 in FIG. 13 which contains a bias potential is placed in close proximity to the photoconductive surface and the developer material is cascaded between the electrode plate and the photoconductive surface. The electrode plate is moved away from xerographic plate during the reproduction of line copy. The use of an electrode plate in the development of xerographic images is well known in the art and does not require a detailed analysis herein.

Figure 16:
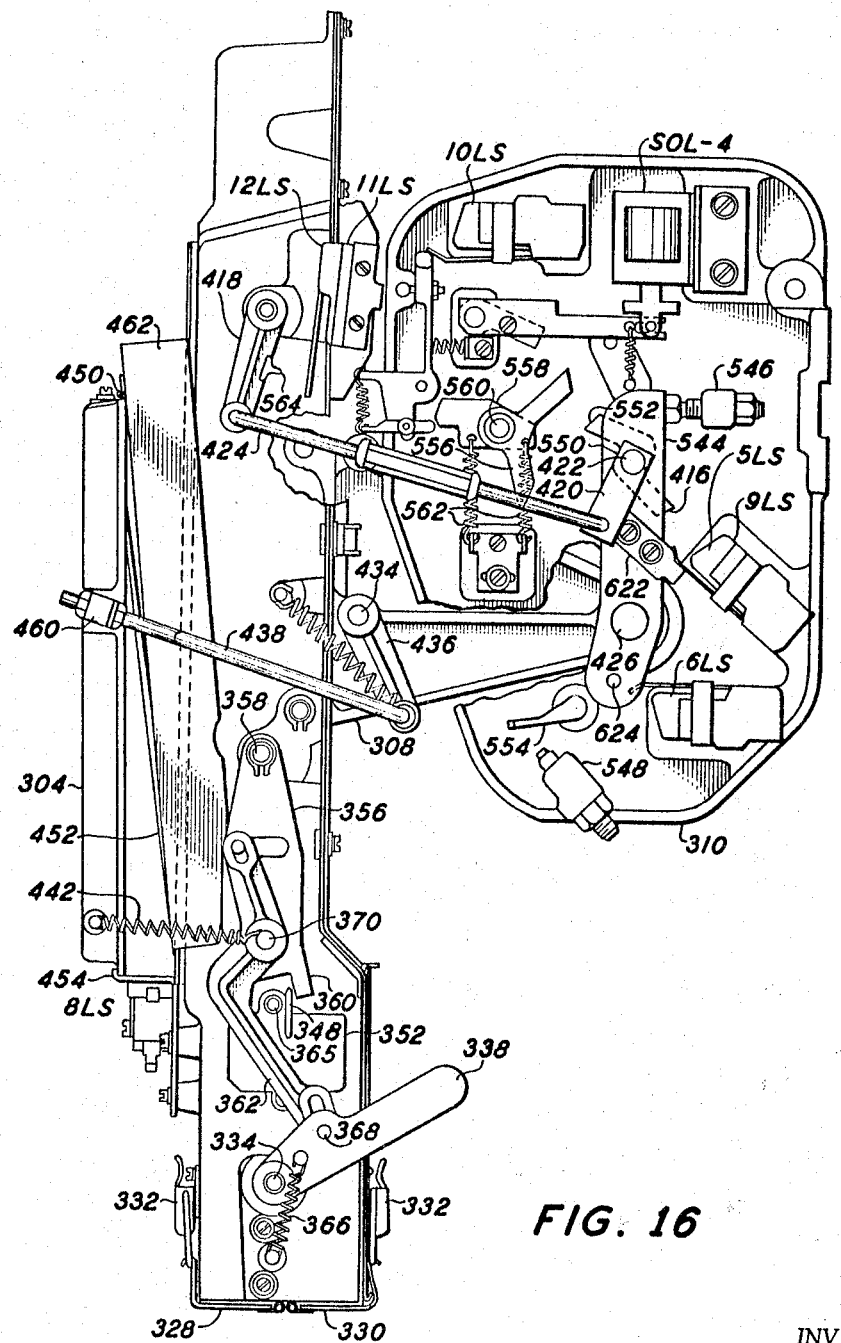
FIG. 16 is a right side view of the developer apparatus and control panel in a plate receiving position.

A toner dispenser 342 is supported on a bracket 344 immediately above the developer pods 322 and 324. A dispensing plate 346 on the bottom of the toner dispenser may be actuated to the right or the left by means of lever 348, seen in FIG. 16, so that toner caught in a series of orifices located in the plate 346 will be deposited in the proper developer pod corresponding to the direction of movement of the plate. The toner material is forced out of the orifices by means of polyurethane pads 350 pressing down on the top of the plate. Toner material may be added to the toner dispenser by removing the side plate 352 from the developer housing and sliding the toner dispenser 342 out of the developer housing along the bracket 344 and removing the cover 354 from the toner dispenser. To prevent toner from being dispensed into the pod that is covered by the cover flap 336 there is a positioning plate 356 pivotally mounted on a shaft 358 on the side of the developer housing as seen in FIG. 16. The positioning plate 356 has a pair of projections 360 which extend downward on either side of the lever 348 to prevent actuation of the lever in one direction. Movement of the tone-line lever 338 moves the plate 356 through linkage member 362 so that one of the projections 360 abuts the toner dispenser lever 348 preventing rotation in that direction. The lever 348 may then be manually operated in the opposite direction to rotate a shaft 365 in the toner dispenser to move the dispensing plate 346 in the direction of the open developer pod. The orifices in the plate 346 on the side above the open developer pod will then be positioned under the polyurethane 350 and the toner will be forced through the orifices into the developer pod.

The tone-line lever 338, located on the side of the developer housing, is rotatably supported on a shaft 334 and serves the dual purposes of rotating the cover flap 336 over the proper developer pod, assuring that the toner dispenser dispenses into the proper pod as described above, and positioning the electrode plate 340 for the tone or line position. As seen in FIG. 16, the tone-line lever 338 is in the tone position and is held in that position by a tension spring 366. As the lever is moved to the line position, in a counterclockwise direction as seen in FIG. 16, a pin 368 rotates linkage member 362 about stub shaft 370 producing clockwise motion of the linkage member. The shaft 334 extends through the developer housing and has an arm 364 secured on the opposite end in the same relative position as the lever 338. The arm 364 moves a linkage member 372 by means of a pin 374 in the same manner as the movement of linkage member 362. The linkage member 372 is mounted on a stub shaft 371 and serves to move a second linkage member 376 at the same time that linkage member 362 rotates a corresponding member 378. Members 376 and 378 are secured to opposite ends of shaft 358 and produce rotational movement of the shaft as the tone-line lever is actuated.

The shaft 358 is supported in the sides of the developer housing and serves to position the electrode plate 340 between the tone and line positions. A pair of pivot arms 380 are secured to the shaft 358 and to a pair of insulating blocks 382 mounted on the back of the electrode plate 340. A pair of connecting rods 384 extend between the pivot arms 380 to a second pair of pivot arms 386 mounted on a shaft 388 near the top of the electrode plate 340. The second set of pivot arms 386 is also connected to a set of insulating blocks 390 secured to the back of the electrode plate.

When the tone-line lever 338 is moved from the tone to the line position the shaft 358 is rotated moving the pivot arms 380 which in turn moves the bottom of the electrode plate 340 toward the back of the developer housing and moves the pivot arm 386 through the connecting rod 384 so that the top of the electrode plate 340 is also moved toward the back of the developer housing through the insulating block 390. The tone-line lever 338 is held in this position by the tension springs 366 and 392 and the electrode plate is held in this position so that there is no movement due to lost motion in the linkage members by a set of torsion springs 394 mounted on the shafts 358 and 388 acting against the pivot arms 380 and 386. When the tone lever 338 is moved to the tone position the shaft 358 is rotated in the opposite direction and electrode plate 340 is moved to a position closer to the xerographic plate. Each end of the electrode plate has a pair of guides 396 to direct the flow of developer material from the developer pods across the xerographic plate and back across the xerographic plate from the upper end of the developer pods when the developer housing is rotated. The upper guide 396 has an electrical connection 398 which is connected to a suitable source of electric power to provide a bias potential on the surface of the electrode plate.

The linkage member 376 also has an arm 402 which is fastened to one end of a connecting rod 404 which is used to set a synchronous motor driven timer 406 which controls the amount of time that the developer housing pauses at the end of each cascade cycle permitting developer material to cascade across the xerographic plate. The time interval allowed for cascading is approximately 1½ seconds for line copy and 5 seconds for tone copy so that the setting of the timer must be changed whenever the tone-line lever 338 is actuated. The connecting rod 404 actuates a pivot arm 408 pivotally mounted on a bracket 410 secured to the back of the developer housing. The pivot arm 410 rotates a shaft 412 mounted in the sides of the developer housing. A cam 414 extends outward from the shaft 412 into engagement with the timer 406. As the shaft 412 is rotated the position of the cam 414 is changed automatically changing the setting on the timer 406.

The angle of cascade of the developer material across the plate surface is determined by the angle at which the developer housing stops during the cascade cycle, approximately 35° to the horizontal for the line copy and approximately 50° from the horizontal for tone copy. This angle of cascade is regulated by a cam 416 located on the switch plate 310. The cam is actuated by an arm 418 secured to the shaft 388, an arm 420 secured to a stub shaft 422 on which the stop cam 416 is mounted and a connecting rod 424 connecting the two arms 418 and 420. Movement of the tone-line lever 338 actuates the shaft 388, as previously described, and in turn actuates the stop cam 416 to either the tone or line position through the arm 418, connecting rod 424 and arm 420.

The entire developer housing is supported by the pivot arms 308 which are mounted for rotation about the main shaft 426. The developer housing is secured to the pivot arms 308 by means of two shafts 428 which extend through the developer housing and are secured in the side walls thereof. As the developer housing is rotated about the shaft 426 a cam 430 engages a deflector 432 secured to the main frame and rotates a shaft 434 mounted in the pivot arms 308. Mounted on the ends of the shaft 434 are a pair of pivot arms 436 which rotate with the shaft 434 and pull connecting rods 438 toward the rear of the apparatus closing the plate clamp 304 thereby securing a plate in the plate clamp against the developer housing. The connecting rod 438 is connected to the plate clamp 304 by a ball joint 440 secured above the center of the plate clamp so that the top of the plate clamp is drawn into the developer housing. The bottom of the plate clamp is urged toward the developer housing by a pair of tension springs 442. The bottom of the plate clamp is forced open when the developer housing is in the vertical position by a cam 444 mounted on the main frame and a pin and sleeve roller 446 mounted on the side of the plate clamp, as seen in FIG. 2. This mechanism assures that the plate clamp is in the open position when the developer housing is in a vertical position and that the plate clamp closes whenever the developer housing moves out of the vertical position. It also permits the top of the plate clamp to be opened by the connecting rod 438 while the bottom of the plate clamp is held in a closed position, thereby tipping the xerographic plate forward towards the plate removal door 312 to permit removal of the xerographic plate. A pair of developer shields 462 are mounted immediately adjacent the plate clamp to minimize the escape of developer material when the plate clamp is open. The shields 448 are pivotally connected to the top of the plate clamp to also act as a guide for the xerographic plate as it is deposited in the plate clamp. The bottom of the shields 448 are pressed against the developer housing by means of a leaf spring 452. When a xerographic plate is deposited in the plate clamp 304 between the shields 448 it comes to rest on a stop 454 and actuates a switch 8LS which prevents operation of the developer housing until a plate has been inserted in the plate clamp.

*Operation*

Figure 26:
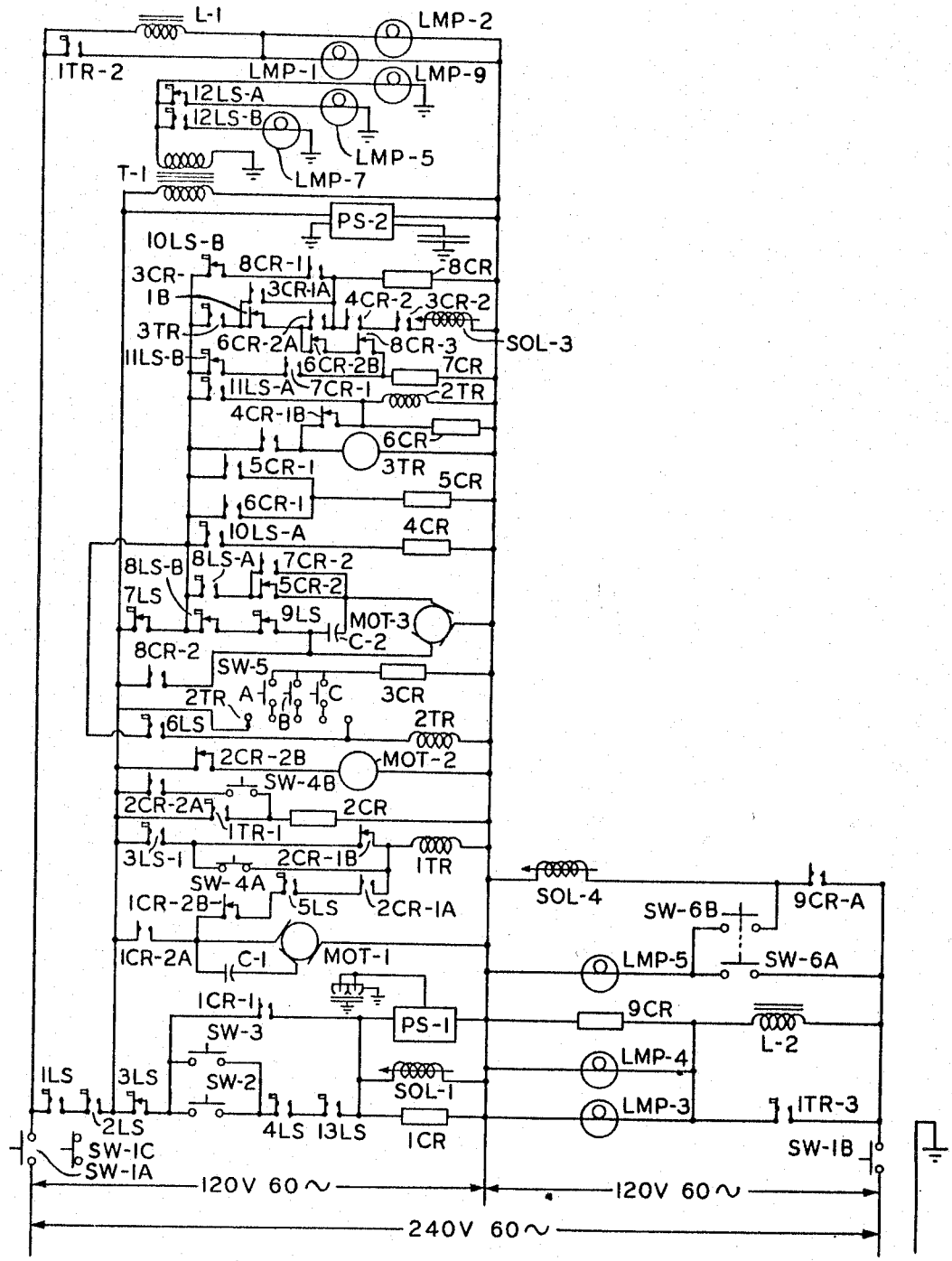
FIG. 26 is a schematic wiring diagram of the electrical circuitry used in the xerographic camera shown in FIG. 1.

The operation and control of the apparatus can best be understood by reference to the schematic wiring diagram shown in FIG. 26 when read in conjunction with the following description. The main control switch SW-1 for the entire apparatus is shown in FIG. 1, and upon actuation connects the electrical circuitry of the apparatus to 240 volt line current.

A series of interlock switches 1LS, 2LS and 3LS are provided in the circuitry to assure that all cover panels on the machine are closed before operation of the machine. The operator may now insert a xerographic plate into the slot 502 so that the plate rests upon the stop 46 substantially as shown in FIG. 2. The stop 46 which is secured to shaft 48 is in a normally closed position and is under the control of solenoid SOL-1. Actuation of the start switch SW-2 on the control panel or SW-3 at the rear of the apparatus near the copyboard provides a closed circuit up to switch 4LS. Switch 4LS is located on the plate transport frame 35 in a position to be actuated by movement of a cam plate 504 mounted on shaft 48 supporting the stops 46. Prior to the insertion of the xerographic plate in the slot 502 the stop 46 and the shaft 48 are in an at rest position as seen in the schematic FIG. 20 wherein the switch 4LS is not actuated, the weight of the plate moves the stop 46 to the lock position wherein the cam plate 504 comes to rest upon a indentation in the lock lever arm 506, indicated as the locked position in the schematic FIG. 21. Actuation of the switch 4LS indicates that a xerographic plate is in position to be charged and closed the contacts 4LS providing a closed circuit to the relay 1CR and solenoid SOL-1. Actuation of relay 1CR closes its normally open contact 1CR-1 providing a holding circuit around switches SW-2 and SW-3 to lock in the relay 1CR and to provide continued actuation of solenoid SOL-1. The solenoid SOL-1 is attached to the lock lever arm 506 and upon actuation releases the lock holding the cam plate 504 in position. The weight of the xerographic plate on the stops 46 continues to rotate the cam plate so that the xerographic plate falls into contact with the drive rollers 70 and the pinch rollers 72. The cam plate 504 also has a bitfurcated arm which upon movement from the locked position to the plate drive position actuates a mechanical counter 508 which registers the number of xerographic plates passed through the apparatus. When the xerographic plate has passed the stops 46 a tension spring 510 returns the cam plate and the stops 46 to the at rest position preparatory to receiving another xerographic plate.

Closing of the contact 1CR-1 also energizes power supply PS-1 which actuates the corotron 98 to place a uniform electrostatic charge on the xerographic plate surface as the xerographic plate passes the corotron.

Relay 1CR also closes its normally open contact 1CR-2A providing power to main drive motor MOT-1 and opens its normally closed contacts 1CR-2B cutting off power to solenoid SOL-2. Actuation of the main drive motor MOT-1 drives the drive rollers 70 and 74 through the main drive sprocket 88, chain 90, and drive sprockets 80. The xerographic plate is thus driven downward past the corotron 98 to the exposure station 28. As the top of the plate passes through the bottom drive rollers 74 and the pinch roller 76 there is a slight drop as the plate contacts the second set of stops 110. The weight of the plate moves the stops 110 from an at rest position, as seen in the schematic drawing FIG. 23, to the locked position whereupon the cam plate 512 secured on shaft 112 actuates switch 3LS. Actuation of switch 3LS opens the normally closed contacts 3LS-1 opening the circuit to the solenoid SOL-1 so that a new plate may now be inserted at the top of the apparatus. The opening of contacts 3LS-1 also de-energizes the top power supply PS-1 cutting off corotron 98 and relay 1CR which permits the contacts 1CR-2A and 1CR-2B to revert to their normally opened and closed positions respectively. Opening of contact 1CR-2A cuts off the main drive motor MOT-1. The xerographic plate is now in position to be exposed to a light image of copy on the copyboard.

A motor MOT-2 in exposure timer 1TR is energized through the normally closed contacts 2CR-2B and upon actuation of the limiting switch 3LS the contacts 3LS-2 are closed energizing the clutch to the timer 1TR through the normally closed switch SW-4A. Actuation of the clutch on the timer 1TR closes the relay and also closes the contacts 1TR-2 and 1TR-3 energizing the lamps LMP1, LMP2, LMP3, and LMP4 illuminating the copy on the copyboard. Closing of the contact 1TR-3 also energizes a relay 9CR which closes contacts 9CR-A to actuate solenoid SOL-4 which operates the shutter of the lens system 32. At the end of the time cycle the contacts 1TR-1 are closed energizing the relay 2CR which opens its normally closed contacts 2CR-2B opening the circuit to the timer motor MOT-2. At this time the contacts 1TR-2 and 1TR-3 return to their normally open position extinguishing the lamps LMP1, LMP2, LMP3, LMP4 and releasing solenoid SOL-5 on the shutter of the lens system. Actuation of relay 2CR also closes contacts 2CR-1A completing a circuit to solenoid SOL-2 through the contacts 5LS-1 of switch 5LS. Switch 5LS is located on the switch plate 310 and is actuated when the developer is in position to receive a plate. Solenoid SOL-2 releases stop 514 permitting the plate to move the stops 110 to the release position as shown in FIG. 24. The plate then falls into contact with the drive rolls 16 and pinch rolls 114 to be driven into the developer system.

Many times in making reproductions of half-tone images it is desirable to first expose the xerographic plate to a dot pattern which discharges small incremental areas of the plate surface and then reexposing the plate to the copy to be reproduced. This concept and procedure is well known in the art and does not require detailed description herein.

When a double exposure is to be made the dot pattern is mounted on the copyboard and the double exposure switch SW-4B on the control panel is depressed. When the switch 3LS is actuated by the xerographic plate dropping into the exposure position the clutch of the timer 1TR is actuated through contacts 3LS-2 and 2CR-1B which was opened when the switch SW-4B was closed. The timer 1TR actuates contacts 1TR-2 and 1TR-3 illuminating the lamps LMP-1 through LMP-4 and at the end of the timing cycle closes contacts 1TR-1 energizing relay 2CR. Relay 2CR closes its contacts 2CR-2A providing a holding circuit for the relay and also opens contacts 2CR-2B cutting off the timer motor. In addition contacts 2CR-1A are closed and 2CR-1B is opened. With switch SW-4A open and contacts 2CR-1B open the circuit to the solenoid SOL-2 is open and will not actuate to drive the plate out of the exposure position. At this point the copy on the copyboard may be changed and the half-tone image placed thereon and the switch SW-4A actuated closing the circuit to the timer clutch 1TR and opening the circuit to the relay 2CR by causing the switch SW-4B to open. De-energizing relay 2CR closes the contacts 2CR-2B energizing the timer motor. Actuation of the timer clutch again exposes the xerographic plate to a light image and at the end of the time cycle the timer 1TR closes its contacts 1TR-1 re-energizing relay 2CR. The operation of the circuit at this point is the same as that described above with the relay 2CR actuated the contacts 2CR-1A are closed and, if the developer housing is in position, the switch 5LS will be actuated closing the contacts 5LS-1 completing the circuit to the exit gate solenoid SOL-2.

The apparatus is also equipped to provide double exposure using a conductive glass plate such as Nesa glass. When a glass plate is used a half-tone screen with the dot pattern is mounted on the glass between the glass and the photoconductive layer. When the plate is passed through the transport system and charged by the corotron charging wires 106 the plate is immediately exposed from the rear through the glass and half-tone screen by a lamp LMP-10 shown in FIGS. 7 and 8. Exposure from the rear by lamp LMP-10 discharges the photoconductive surface in the selected areas unprotected by the half-tone screen thus establishing a charge pattern on the plate surface. A fifth lamp LMP-5 and a switch SW-6 located on the control panel are provided for focusing purposes and removal of shadow lines when index cards are to be reproduced. The switch SW-6 is a 3-position switch having an off position, an automatic position and a focus position. In the off position the lamp LMP-5 is not actuated even during exposure, in the focus position the lamp LMP-5 is the only lamp on and used for focusing purposes as previously described, and in the automatic position the lamp LMP-5 is illuminated during exposure to eliminate any shadow lines on the copy. In the circuit diagram the switch SW-6B is closed in the automatic position so that the fifth lamp is illuminated at the same time that the shutter solenoid SOL-4 is actuated. When the lamp is to be used for focusing only the switch SW-6A is closed so that the lamp may be operated independent of the operation of the apparatus.

With the developer housing in place and the switch 5LS closed the solenoid SOL-2 withdraws the lock stop 514 permitting the cam plate 110 to move to the position so that the xerographic plate falls into contact with the pinch and drive rolls 114 and 116 respectively. After the xerographic plate has been driven past the stops 110 the cam plate 512 and the stops 110 are returned to the at rest position by spring 516 whereby switch 3LS is released closing the contacts 3LS-1. With the contact 3LS-1 in its normally closed position a new plate resting on the stops 46 will not be driven down to the exposure position so that exposure of the second plate may occur while the first plate is being developed.

Figure 14:
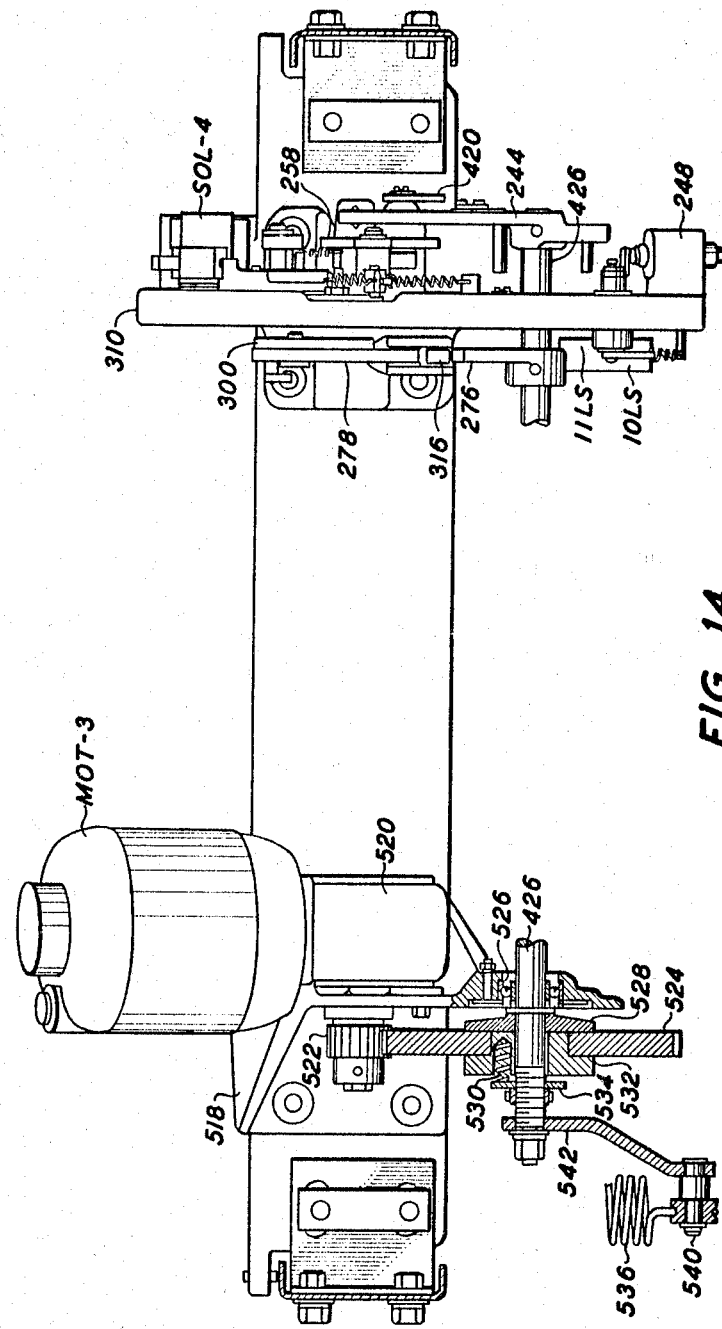
FIG. 14 is a detailed view of the developer drive system and control plate with portions broken away to show internal structure.
Figure 15:
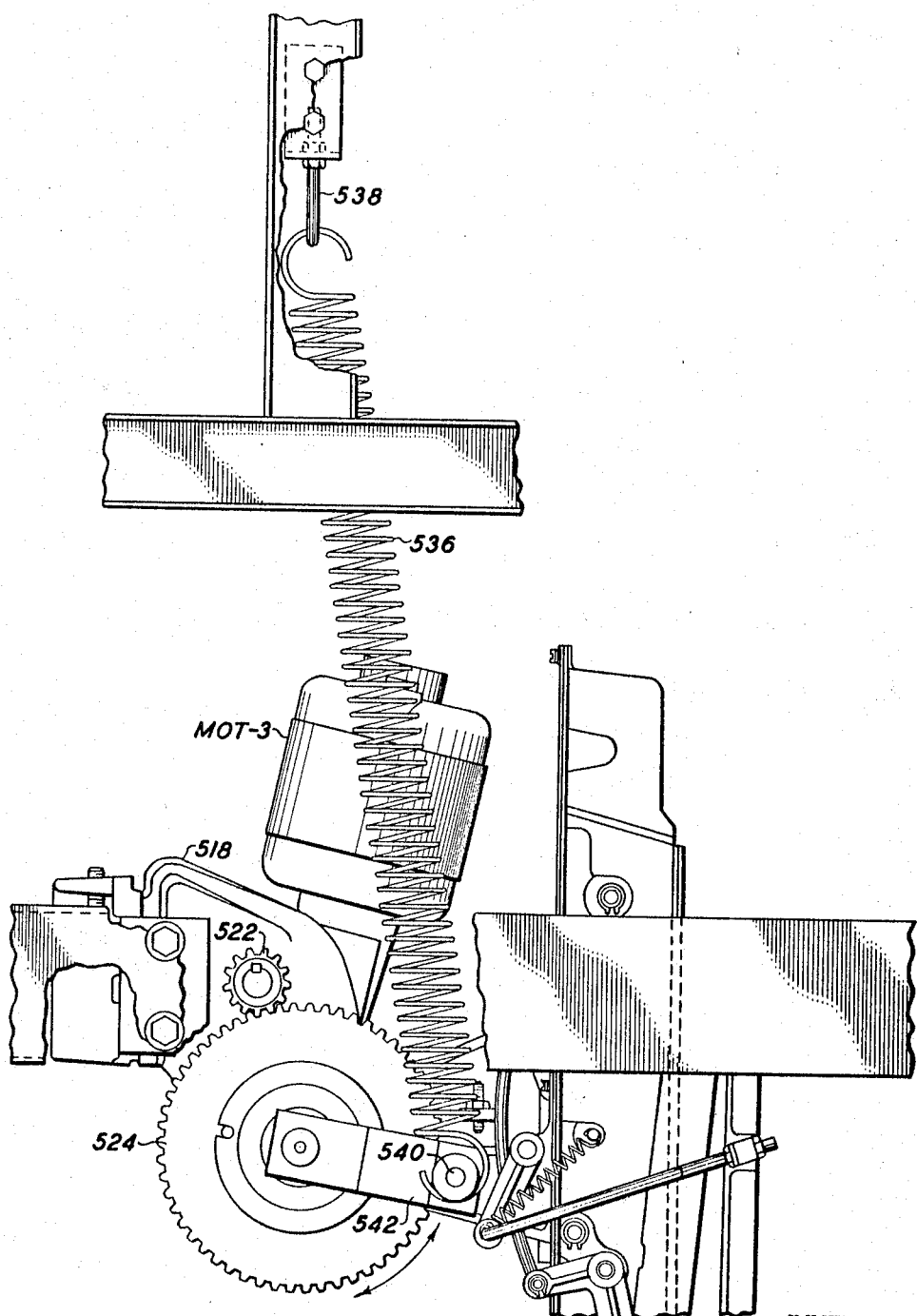
FIG. 15 is a left side view of the developer drive mechanism with portions broken away to show internal structure.

When the xerographic plate passes through the drive roller 120 and pinch roller 118 it comes to rest on the plate stops 454 at the bottom of the plate clamps 304, at which point it actuates switch 8LS. The contacts of the switch 8LS are in the control circuitry for the developer drive motor MOT-3. The developer drive motor is a reversible motor which may be used to drive the developer housing in either direction. FIGS. 14 and 15 show the motor MOT-3 mounted on a bracket 518 supported from a cross member of the main frame.

The motor MOT-3 drives the shaft 426 through a gear box 520, pinion 522 and drive gear 524. The shaft 426 is journaled in a bearing 526 in the bracket 518 and is driven by the gear 524 through a clutch plate 528 secured on the shaft. The gear 524 presses against the clutch plate 528 under the action of a compression spring 530 bearing against sleeve bearing 532 and collar 534 secured on the shaft 426. The spring 530 forces the gear 524 and sleeve bearing 532 against the face of the clutch plate 528 providing slip-clutch arrangement that protects the apparatus from permanent damage in the event that the motor overrides the stop positions of the developer housing. A counter-balancing spring 536 is secured at one end to the main frame by means of fastener 538 and at the other end to a pin on a lever arm 542. The lever arm 542 is secured to the end of the shaft 426 to provide a counter-balancing force for the developer housing when the developer housing is in a vertical position and during cascading. As seen in FIG. 15 the counter-balancing spring 536 swings through an arc which passes on both sides of the shaft 426 as the developer housing moves through a cascade cycle so that the same spring provides the counter-balancing force in all positions of the developer housing except when the developer housing passes through a horizontal position.

With a xerographic plate in position in the plate clamp and the switch 8LS actuated the motor MOT-3 is energized through the normally closed switch 7LS, the now closed contacts 8LS-A of switch 8LS and normally closed contacts 5CR-2 to drive the shaft 426 and the developer housing in a forward direction. With the switch 8LS actuated the normally closed contacts 8LS-B are opened so that the motor MOT-3 will not drive in the reverse direction. As the shaft 426 rotates a pivot arm 544 mounted on the shaft 426 swings downward from the position shown in FIG. 16 wherein it abuts a stop 546, to the position shown in FIG. 17 wherein the stop cam 416, mounted on the pivot arm 544, abuts stop 548 mounted on the switch plate 310. As previously pointed out the stop cam 416 is oriented to a tone position. That is, the suface 550 abuts the stop 548 and the developer housing moves to a position wherein the xerographic plate is oriented at approximately 50° to the horizontal. When the stop cam 416 is moved to the line position the surface 552 abuts the stop 548 and the developer housing comes to rest at approximately 35° to the horizontal. As the pivot arm 544 rotates downward to the position shown in FIGURE 17 a switch actuating arm 554 is caught between the stop cam 416 and the stop 548 actuating a switch 11LS mounted on the opposite side of the switch plate as seen in FIG. 19. On its downward movement the pivot arm 544 bumps an arm 556 of an intermediate cascade stop 558 deflecting the stop 558 out of the path of travel of the arm 544. The stop 558 is rotatably mounted on a stub shaft 560 in the switch plate 310 and is held in position by two tension springs 562 which permit the stop to be deflected and return to its original position. With the pivot arm 544 abutting the stop 548 the switch 11LS is actuated and the switch 5LS is opened. The contacts 5LS-1 return to their normally open positions so that the exit gate solenoid SOL-2 at the bottom of the exposure position cannot be actuated and a xerographic plate cannot be driven downward until the developer housing returns to the vertical position. This is a safety feature that prevents a xerographic plate being driven downward when the developer housing and the plate clamp are not properly oriented to receive the plate. Actuation of the switch 11LS closes the normally open contacts 11LS-A which serves to shut off the forward motion of the motor MOT-3 by actuating relay 6CR which in turn closes its normally open contacts 6CR-1 actuating relay 5CR which opens contacts 5CR-2 cutting off power to the motor MOT-3. Closing of contacts 11LS-A also energizes timer 3TR which is a ½ to 5 second timer that controls the length of time that the developer housing will remain in the first cascade position to permit developer material to cascade across the plate surface. A switch 12LS is actuated by a projection 564 on linkage member 418 at the side of the developer housing as previously described to indicate on the front control panel whether line or tone copy is being reproduced. The switch 12LS has normally open contacts 12LS which will illuminate lamp LMP-7 on the control panel when the switch 12LS is actuated indicating that line copy is being reproduced. When the switch 12LS is not actuated the normally closed contacts 12LS-A illuminate lamp LMP-8 to indicate that tone copy is being reproduced. Closing of the contacts 11LS-A further actuates a counter 2TR which counts the number of cascade cycles that the developer is to pass through. For purposes of description herein a cascade cycle is defined as moving the developer housing to a position wherein the developer material cascades from the developer pods 328 and 330 across the xerographic plate and the developer housing returns to a position wherein the developer will again cascade across the plate back into the developer pod. The equipment is capable of varying the number of cascade cycles performed depending on the type of copy being reproduced and the density of reproduced image that is desired. A switch SW-5 on the control panel allows the operator to select the number of cascade cycles to be performed. The switch SW-5 is shown in the schematic wiring diagram as having three sets of contacts SW-5A, SW-5B, and SW-5C which permit the selection of two, four or six cycles respectively. When the counter 2TR is actuated the switch 2TR progressively contacts one of the switches SW-5A through C until the switch which is closed completes a circuit to relay 3CR. It should be noted that actuation of the relay 5CR to cut off the power to the motor MOT-3 also closed a pair of contacts 5CR-1 providing a holding circuit for relay 5CR so that the motor MOT-3 cannot be energized in the forward direction during the time that the timer 3TR is running.

When the timer 3TR has run out the normally open contacts 3TR are closed energizing the relay 8CR through the normally closed contacts 3CR-1B and the contacts 6CR-2A which have been closed through the actuation of relay 6CR. Energization of relay 8CR closes its contacts 8CR-1 providing a holding circuit for the relay through limiting switches contacts 10LSB and closes contacts 8CR-2 driving the motor MOT-3 in the reverse direction. As the motor MOT-3 drives in the reverse direction the stop cam 416 releases the switch 11LS opening the contacts 11LS-A which de-energize the relay 6CR. It should be noted at this point that a pair of normally closed contacts 8CR-3 are inserted in the circuit to the relay 7CR so that the relay cannot be energized when the relay 6CR is de-energized.

As the motor MOT-3 drives the developer housing back towards the vertical position the pivot arm 844 moves back in a counterclockwise direction as seen in FIG. 17 until it engages arm 556 of intermediate cascade stop 558. The intermediate cascade stop 558 is rotated in a counterclockwise direction until a second arm 556 abuts the second cascade stop 568. As the intermediate cascade stop 558 is rotated it engages a one-way pivot arm 570 on a pivoted switch actuator 572. The pivot arm 570 is spring loaded so that the stop 558 may pass in a clockwise direction as seen in FIG. 17 without moving the switch actuator 572, but cannot move past the arm 570 in a clockwise direction without pivoting the switch actuator 572 and actuating switch 10LS. Actuation of the switch 10LS opens the normally closed contacts 10LS-B de-energizing relay 8CR which opens the contacts 8CR stopping the motor MOT-3 and the developer housing comes to rest at the second cascade position. Actuation of the switch 10LS also closes contacts 10LS-A energizing relay 4CR which closes its contacts 4CR-1A energizing the timer 3TR and opening its contacts 4CR-1B which prevents energization of relay 6CR or the cascade counter 2TR. The developer material in the developer housing now cascades back across the plate surface to the developer pods and after the timer 3TR has run out the contacts 3TR are again closed energizing relay 7CR through the normally closed contacts 3CR-1B, 6CR-2B and 8CR-3. Energization of relay 7CR closest he contacts 7CR-1 providing a holding circuit for relay 7CR and closes the contacts 7CR-2 energizing the motor MOT-3 in a forward direction. The motor MOT-3 then drives the developer housing back to the first cascade position where the switch 10LS is again actuated as previously described and the counter 2TR is actuated.

The sequence above will be repeated until the number of cascade cycles selected by the operator at switch SW-5 have been completed. Assuming for purposes of this discussion that the number of cycles desired was two and the switch SW-5A was closed, as shown in the circuit diagram, then actuation of the counter 2TR at this point would provide a completed circuit through the switch 2TR, SW-5A to relay 3CR. Actuation of relay 3CR would reverse the normal orientation of the switches 3CR-1B and 3CR-1A so that the relay 8CR may be actuated and the relay 7CR will not be actuated when the timer 3TR runs out. When the timer 3TR runs out and the relay 8CR is actuated the motor MOT-3 is then again driven in the reverse direction until the pivot arm 544 abuts the intermediate cascade stop 558 and the switch 10LS is again actuated. At this point the switch 10LS again de-energizes relay 8CR cutting off the motor MOT-3 leaving the developer housing in the second cascade position. After the expiration of the timer 3TR the motor MOT-3 must again drive the developer housing in the reverse direction towards the plate removal position rather than in the forward direction back toward the first cascade position. To accomplish this, the contacts of relay 3CR have previously been reversed from their normal orientation as described above by the actuation of switch 2TR so that relay 8CR is again energized when the contacts 3TR are closed. Energizing of relay 8CR closes contacts 8CR-2 tending to drive the motor MOT-3 in the reverse direction. However, the pivot arm 544 is abutting the intermediate cascade stop 558 which is abutting the second cascade stop 568. Also, a solenoid SOL-3 which is connected to a lever 574 secured to the stop 568 is energized at the same time that relay 8CR is actuated through the closed contacts 3CR-1A, 4CR-2 and 3CR-2. Energization of the solenoid SOL-3 withdraws the stop 868 from the path of the intermediate cascade stop 558 permitting the cascade stop to rotate in a counterclockwise direction as seen in FIG. 10.

With the removal of the stop 568 and the motor MOT-3 driving in the reverse direction the pivot arm 544 continues to rotate back towards the vertical position deflecting the intermediate cascade stop 558 from its path of travel.

As the pivot arm 544 moves toward the vertical position a cam 576 mounted on shaft 426 on the reverse side of the switch plate 310 rotates from the position shown in FIGURE 18 to the position shown in FIGURE 19 and pivots a plate 578 against the action spring 582.

A lock arm 584 is pivotally secured at one end to the plate 578 and at the other end is slideably mounted on a pin 586 beneath the plate door assembly 312. A plate removal door 588 is pivotally mounted at the front of the machine on a rotatable shaft 590 to be swung open to permit the operator to remove a xerographic plate from the plate clamp when the developer housing is in a plate removal position. The shaft 590 has an arm 592 secured thereto in interference relationship with the top of the lock arm 584. As the lock arm 584 is advanced by the movement of the plate 578 a notched area in the arm is advanced to a position beneath the arm 592 permitting rotation of the arm 592 through the notched area. When the lock arm 584 is withdrawn by the tension spring 582 and the plate 578 then the upper surface of the lock arm is directly beneath the arm 592 preventing rotation thereof. The arm 592 is also rotated by the movement of the plate 578 after a loss motion or a delay between the plate 578 and a lock lever 594. As the plate 578 is moved forward by the cam 576 the lock arm 584 is imediately moved forward releasing the arm 592 on the door 588 and subsequent thereto a finger of a rotatable member 600 mounted on the plate 578 deflects a switch actuator and locking device 602 pivotally mounted on a pin 603 about which the plate 578 rotates. The rotatable member 600 is held against a stop 605 by a spring 607 so that the member 600 deflects the switch actuator 602 downward against the action of compression spring 608 to actuate switch 7LS. A locking pin 604 prevents the door lever 594 from being operated before the switch 7LS is actuated. As the actuator 602 moves downward the pin 604 disengages the lever 594 permitting a tension spring 606 to actuate the lever and open the door 588.

The actuation of the 7LS switch opens its contacts 7LS which overrides the forward movement circuit of the motor MOT-3. The developer housing is now in a plate removal position i.e., approximately 17° from the vertical. As the developer housing moved into this position the plate clamp 304 has been actuated by the deflector 432 opening the top of the plate clamp. The bottom of the plate clamp is still held against the developer housing by the action of tension spring 442 so that the xerographic plate in the plate clamp tends to fall forward against the plate clamp and become accessible through the plate removal door 588. The operator may now remove the plate from the plate clamp merely by reaching in behind the door 588. With the removal of the plate from the plate clamp the switch 8LS is released allowing the contacts 8LS-A and 8LS-B to revert to their normal positions thus, the open contacts 8LS-A prevent the motor MOT-3 from being operated in a forward direction so that the developer housing cannot proceed through a cascade cycle until a new plate has been placed in the plate clamp.

The operator now closes the door 588 forcing the lever 594 in a counterclockwise direction as seen in FIG. 19. A finger-like projection 612 on the lever 594 deflects the rotatable member 600 against the action of spring 607 releasing the switch actuator and locking device 602 so that the actuator 602 moves upward under the action of spring 608 releasing the spring 7LS and positioning the locking pin 604 to secure the lever 594. With the release of switch 7LS and the closing of contacts 7LS the motor MOT-3 is actuated in a reverse direction through the contacts 7LS, 8LS-B and 9LS to move the developer housing toward the vertical or plate receiving position. As the developer housing moves toward the vertical position the cam 576 releases the plate 578 so that it snaps back to its original position against pin 614 under the action of spring 582. Movement of the plate 578 positions the locking arm 584 preventing the door 588 from being opened. The follower portion 616, pivotally mounted on the plate 578, is held in position by spring 618 against an adjustable stop 620 so that as the developer housing proceeds from the vertical position to the cascade cycling positions the cam 576 may deflect the follower 616 without actuating the plate 578.

As the developer housing moved into the vertical position the pin 446, as seen in FIG. 2, engaged the cam 444 forcing the bottom of the clamp 304 into an open position and the switches 5LS and 9LS were actuated by switch actuator 622 on the pivot arm 544. A second switch actuator 624 actuated switch 6LS momentarily closing the contacts 6LS in the reset circuit of the counter 2TR, resetting the counter for the next cascade cycle. Actuation of the switch 9LS de-energized the motor MOT-3 bringing the developer housing to a stop in the vertical position and actuation of the switch 5LS energizes the exit gate solenoid SOL-2 permitting a zerographic plate in the exposure position to be driven downward into the plate clamp of the developer housing to be developed therein.

While the invention has been described with reference to the structure disclosed herein, it is not confined to the details set forth, and this application is intended to cover such modifications or changes as may come within the purposes of the improvements or the scope of the following claims.

What is claimed is:

1. Developing apparatus for developing electrostatic latent images on a xerographic plate by selectively cascading developer material thereacross according to the electrical characteristics of the latent image comprising contiguous walls forming an elongated housing wherein one of said longitudinally extending walls being formed with an opening therein to receive a xerographic plate having an electrostatic latent image to be developed exposed to the interior of said housing, movable support means suspended from a rotatable shaft and being associated with said housing for supporting the same in a plate loading condition, a backing electrode extending parallel to said plate and being movable from a first position closely spaced to said plate associated with tone copy to a second position spaced farther from said plate associated with line copy, chamber means located at one end of said housing to separately contain at least two different developer materials one material being associated with producing line and another material for tone copy, said chamber means being in communication with the interior of said housing and including a displaceable wall member pivotally mounted on a common wall centrally located in said chamber, said displaceable wall member being movable from a first position to close off one side of said chamber allowing a one of said materials to be cascaded and being movable to a second position to close off the other side of said chamber allowing the other said material to be cascaded, motor driven drive means connected to said housing and adapted to swing said housing about the axis of said shaft in a first direction to a first cascade position and then in a second direction to a second cascade position, cam means positioned on said support means an engageable with a pair of switches, a one of said switches being located in the first direction path of said housing, and the other being located in the second direction path, said motor driven drive means being responsive to the actuation of said switches to stop the swing of said housing beyond a predetermined position defined by the placement of each of said switches, said cam means including a displaceable camming surface for adjusting the angular displacement of said housing at which said switches are engaged from one position in the case of line copy to another position in the case of tone copy.

timing means responsive to actuation of said switches and operable to interrupt the movement of said motor driven means for a predetermined time interval to define the time duration at which said housing remains in said first and second cascade positions, said timing means including a movable stop member for permitting the adjustment of the time interval for which said motor driven drive means is interrupted, said stop member having a first position associated with line copy and a second position associated with tone copy, and control means to conjointly move said displaceable wall member, said backing electrode, said camming surface, and said stop member to provide line or tone development as aforesaid in accordance with the electrical characteristics of the latent image to be developed.

2. The aparatus of claim 1 including:

circuit means to selectively repeat the movement of the developer housing between the first cascade position and the second cascade position prior to said housing being moved to a plate removal position.

3. The apparatus of claim 1 including:

toner dispensing means closely spaced to and spanning said common wall in said developer housing, to add toner material to the open portion of said chamber means, and means to actuate the toner dispenser.

References Cited by the Examiner

UNITED STATES PATENTS

| | | | |
|---|---|---|---|
| 982,371 | 1/1911 | Lacy | 222—142.6 |
| 1,835,247 | 12/1931 | Smagola | 222—142.6 |
| 2,550,724 | 5/1951 | Sabel et al. | 118—57 X |
| 2,550,738 | 5/1951 | Walkup | 118—57 X |
| 3,057,324 | 10/1962 | Iwerks | 118—57 X |
| 3,160,057 | 12/1964 | Murray et al. | 95—1.7 X |

MORRIS KAPLAN, *Primary Examiner.*